(12) United States Patent
Gao et al.

(10) Patent No.: US 11,856,149 B2
(45) Date of Patent: Dec. 26, 2023

(54) METHOD FOR ESTABLISHING CALL CONNECTION, FIRST TERMINAL, SERVER, AND STORAGE MEDIUM

(71) Applicant: Tencent Technology (Shenzhen) Company Limited, Shenzhen (CN)

(72) Inventors: Yi Gao, Shenzhen (CN); Chi Xi, Shenzhen (CN); Jingcong Chen, Shenzhen (CN); Cheng Luo, Shenzhen (CN); Bin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 279 days.

(21) Appl. No.: 17/367,268

(22) Filed: Jul. 2, 2021

(65) Prior Publication Data
US 2021/0337071 A1 Oct. 28, 2021

Related U.S. Application Data

(63) Continuation of application No. PCT/CN2020/101759, filed on Jul. 14, 2020.

(30) Foreign Application Priority Data
Jul. 29, 2019 (CN) .......................... 201910690827.2

(51) Int. Cl.
*H04M 7/00* (2006.01)
*H04M 1/72403* (2021.01)
(Continued)

(52) U.S. Cl.
CPC ...... *H04M 7/0072* (2013.01); *H04L 65/1069* (2013.01); *H04M 1/253* (2013.01);
(Continued)

(58) Field of Classification Search
None
See application file for complete search history.

(56) References Cited

U.S. PATENT DOCUMENTS

| 6,373,839 B1 | 4/2002 | Clark et al. |
| 7,307,958 B2 | 12/2007 | Lee et al. |

(Continued)

FOREIGN PATENT DOCUMENTS

| CN | 1871843 A | 11/2006 |
| CN | 101052154 A | 10/2007 |

(Continued)

OTHER PUBLICATIONS

Tencent Technology, WO, PCT/CN2020/101759, Oct. 19, 2020, 5 pgs.

(Continued)

*Primary Examiner* — Lashonda Jacobs-Burton
(74) *Attorney, Agent, or Firm* — Morgan, Lewis & Bockius LLP

(57) ABSTRACT

This application discloses a method for establishing a call connection, a first terminal, a server, and a storage medium. The method includes: obtaining, by a first terminal, a second vocoder list of a second terminal, the second vocoder list including vocoders supported by the second terminal and with corresponding priorities; determining, by the first terminal, a first vocoder with the highest priority among vocoders that exist in both a first vocoder list of the first terminal and the second vocoder list, the first vocoder list including vocoders supported by the first terminal and with corresponding priorities, and the priorities of the vocoders being positively correlated with audio frequencies in encoding and decoding of the vocoders; and requesting, by the first terminal by using the first vocoder, to establish a first call connection to the second terminal.

15 Claims, 14 Drawing Sheets

(51) Int. Cl.
*H04M 1/72454* (2021.01)
*H04M 1/253* (2006.01)
*H04M 1/72406* (2021.01)
*H04L 65/1069* (2022.01)

(52) U.S. Cl.
CPC ... *H04M 1/72403* (2021.01); *H04M 1/72406* (2021.01); *H04M 1/72454* (2021.01); *H04M 2207/20* (2013.01)

(56) References Cited

U.S. PATENT DOCUMENTS

| | | | | |
|---|---|---|---|---|
| 7,328,027 | B1* | 2/2008 | Mangal | H04M 7/0057 |
| | | | | 455/445 |
| 2005/0037790 | A1* | 2/2005 | Chang | H04W 88/181 |
| | | | | 455/510 |
| 2005/0083910 | A1* | 4/2005 | Hallin | H04W 88/181 |
| | | | | 370/352 |
| 2009/0131119 | A1* | 5/2009 | Chang | G10H 7/002 |
| | | | | 455/567 |
| 2009/0154658 | A1* | 6/2009 | Kasper | H04M 7/0072 |
| | | | | 379/32.01 |
| 2016/0381229 | A1* | 12/2016 | Singh | H04M 7/0072 |
| | | | | 370/259 |

FOREIGN PATENT DOCUMENTS

| | | | |
|---|---|---|---|
| CN | 101662468 | A | 3/2010 |
| CN | 102196106 | A | 9/2011 |
| CN | 102223315 | A | 10/2011 |
| CN | 107181723 | A | 9/2017 |
| CN | 110445929 | A | 11/2019 |

OTHER PUBLICATIONS

Tencent Technology, IPRP, PCT/CN2020/101759, Feb. 1, 2022, 6 pgs.
Tencent Technology, ISR, PCT/CN2020/101759, Oct. 19, 2020, 2 pgs.

* cited by examiner

METHOD FOR ESTABLISHING CALL CONNECTION, FIRST TERMINAL, SERVER, AND STORAGE MEDIUM

CROSS-REFERENCE TO RELATED APPLICATIONS

This application is a continuation application of PCT Patent Application No. PCT/CN2020/101759, entitled "CALL CONNECTION ESTABLISHMENT METHOD, FIRST TERMINAL, SERVER, AND STORAGE MEDIUM" filed on Jul. 14, 2020, which claims priority to Chinese Patent Application No. 201910690827.2, filed with the State Intellectual Property Office of the People's Republic of China on Jul. 29, 2019, and entitled "METHOD FOR ESTABLISHING CALL CONNECTION, FIRST TERMINAL, SERVER, AND STORAGE MEDIUM", all of which are incorporated herein by reference in their entirety.

FIELD OF THE TECHNOLOGY

This application relates to the field of communications, and specifically, to a method for establishing a call connection, a first terminal, a server, and a storage medium.

BACKGROUND OF THE DISCLOSURE

In the related art, a call connection is usually established between terminals by using default vocoders of the terminals.

However, in the foregoing method, the default vocoders of the terminals may be different. As a result, the call connection cannot be efficiently established, resulting in low efficiency in establishing the call connection.

For the foregoing problem, no effective solution has been provided yet.

SUMMARY

According to embodiments provided in this application, a method for establishing a call connection, a first terminal, a server, and a storage medium are provided.

According to an aspect of the embodiments of this application, a method for establishing a call connection is provided, including: obtaining, by a first terminal, a second vocoder list of a second terminal, the second vocoder list including vocoders supported by the second terminal and with corresponding priorities; determining, by the first terminal, a first vocoder with the highest priority among vocoders that exist in both a first vocoder list of the first terminal and the second vocoder list, the first vocoder list including vocoders supported by the first terminal and with corresponding priorities, and the priorities of the vocoders being positively correlated with audio frequencies in encoding and decoding of the vocoders; and requesting, by the first terminal by using the first vocoder, to establish a first call connection to the second terminal.

According to another aspect of the embodiments of this application, a method for establishing a call connection is further provided, including: transmitting, by a server, a second vocoder list of a second terminal to a first terminal, so that the first terminal determines a first vocoder with the highest priority among vocoders that exist in both a first vocoder list of the first terminal and the second vocoder list, and requests, by using the first vocoder, to establish a first call connection to the second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders; and transmitting, by the server, the first vocoder list of the first terminal to the second terminal, so that the second terminal determines the first vocoder with the highest priority among the vocoders that exist in both the first vocoder list and the second vocoder list of the second terminal, and replies with the first vocoder to the request of the first terminal to establish the first call connection.

According to still another aspect of the embodiments of this application, a method for establishing a call connection is further provided, including: receiving, by a server, a first vocoder list of a first terminal and a second vocoder list of a second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders; determining, by the server, a first vocoder with the highest priority among vocoders that exist in both the first vocoder list and the second vocoder list; and transmitting, by the server, a notification message carrying an identifier of the first vocoder to the first terminal and the second terminal, so that a first call connection is established between the first terminal and the second terminal by using the first vocoder according to the notification message.

According to still another aspect of the embodiments of this application, a method for establishing a call connection is further provided, including: receiving, by a server, a first vocoder list of a first terminal, the first vocoder list including vocoders supported by the first terminal and with corresponding priorities; determining, by the server, a first vocoder with the highest priority among vocoders that exist in both the first vocoder list and a target vocoder list of the server, the target vocoder list including vocoders supported by the server and with corresponding priorities, and the priorities of the vocoders being positively correlated with audio frequencies in encoding and decoding of the vocoders; and transmitting, by the server, a notification message carrying an identifier of the first vocoder to the first terminal, so that the first terminal establishes a first call connection to the server by using the first vocoder according to the notification message.

According to still another aspect of the embodiments of this application, a first terminal is further provided, including: a first obtaining unit, configured to obtain a second vocoder list of a second terminal, the second vocoder list including vocoders supported by the second terminal and with corresponding priorities; a second obtaining unit, configured to determine a first vocoder with the highest priority among vocoders that exist in both a first vocoder list of the first terminal and the second vocoder list, the first vocoder list including vocoders supported by the first terminal and with corresponding priorities, and the priorities of the vocoders being positively correlated with audio frequencies in encoding and decoding of the vocoders; and a first request unit, configured to request, by using the first vocoder, to establish a first call connection to the second terminal.

In an example, the first terminal further includes: a first transmission unit, configured to transmit the first vocoder list of the first terminal to the second terminal before the first terminal requests, by using the first vocoder, to establish the first call connection to the second terminal, so that the second terminal determines the first vocoder with the highest priority among the vocoders that exist in both the first vocoder list and the second vocoder list, and replies with the first vocoder to the request of the first terminal to establish the first call connection.

In an example, the first terminal further includes: an establishment unit, configured to establish the first call connection between the first terminal and the second terminal after the first terminal requests, by using the first vocoder, to establish the first call connection to the second terminal; a third obtaining unit, configured to receive a third vocoder list transmitted by a third terminal, the third vocoder list including vocoders supported by the third terminal and with corresponding priorities, and the priorities of the vocoders being positively correlated with audio frequencies in encoding and decoding of the vocoders; a fourth obtaining unit, configured to determine a second vocoder with the highest priority among vocoders that exist in the first vocoder list, the second vocoder list, and the third vocoder list; and a processing unit, configured to switch the first vocoder for a call to the second terminal to the second vocoder, and request, by using the second vocoder, to establish a second call connection to the third terminal.

In an example, the first terminal further includes: a second transmission unit, configured to transmit the first vocoder list of the first terminal to the third terminal before the first terminal requests, by using the second vocoder, to establish the second call connection to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

In an example, the first terminal further includes: a receiving unit, configured to receive, after the first terminal requests, by using the second vocoder, to establish the second call connection to the third terminal, second audio data of the second terminal by using the first call connection, and receive third audio data of the third terminal by using the second call connection; an audio mixing unit, configured to perform an audio mixing operation on the second audio data and the third audio data, to obtain an audio mixing result; and a playing unit, configured to play the audio mixing result.

According to still another aspect of the embodiments of this application, a server for establishing a call connection is further provided, including: a first transmission unit, configured to transmit a second vocoder list of a second terminal to a first terminal, so that the first terminal determines a first vocoder with the highest priority among vocoders that exist in both a first vocoder list of the first terminal and the second vocoder list, and requests, by using the first vocoder, to establish a first call connection to the second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders; and a second transmission unit, configured to transmit the first vocoder list of the first terminal to the second terminal, so that the second terminal determines the first vocoder with the highest priority among the vocoders that exist in both the first vocoder list and the second vocoder list of the second terminal, and replies with the first vocoder to the request of the first terminal to establish the first call connection.

In an example, the server further includes: a receiving unit, configured to receive a third vocoder list of a third terminal after the first terminal establishes the first call connection to the second terminal, the third vocoder list including vocoders supported by the third terminal and with corresponding priorities, and the priorities being positively correlated with audio frequencies in encoding and decoding of the vocoders in the third vocoder list; and a third transmission unit, configured to transmit the third vocoder list to the first terminal and the second terminal, and transmit the first vocoder list and the second vocoder list to the third terminal.

According to still another aspect of the embodiments of this application, a server for establishing a call connection is further provided, including: a receiving unit, configured to receive a first vocoder list of a first terminal and a second vocoder list of a second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders; a determining unit, configured to determine a first vocoder with the highest priority among vocoders that exist in both the first vocoder list and the second vocoder list; and a transmission unit, configured to transmit a notification message carrying an identifier of the first vocoder to the first terminal and the second terminal, so that a first call connection is established between the first terminal and the second terminal by using the first vocoder according to the notification message.

According to still another aspect of the embodiments of this application, a server for establishing a call connection is further provided, including: a first receiving unit, configured to receive a first vocoder list of a first terminal, the first vocoder list including vocoders supported by the first terminal and with corresponding priorities; a determining unit, configured to determine a first vocoder with the highest priority among vocoders that exist in both the first vocoder list and a target vocoder list of the server, the target vocoder list including vocoders supported by the server and with corresponding priorities, and the priorities of the vocoders being positively correlated with audio frequencies in encoding and decoding of the vocoders; and a first transmission unit, configured to transmit a notification message carrying an identifier of the first vocoder to the first terminal, so that the first terminal establishes a first call connection to the server by using the first vocoder according to the notification message.

In an example, the server further includes: a second receiving unit, configured to receive second audio data of a second terminal and third audio data of a third terminal after the first terminal establishes the call connection to the server, the second terminal and the third terminal being terminals that each establish a call connection to the server; an audio mixing unit, configured to perform an audio mixing operation on the second audio data and the third audio data, to obtain an audio mixing result; and a second transmission unit, configured to transmit the audio mixing result to the first terminal.

According to still another aspect of the embodiments of this application, one or more non-volatile storage media storing computer-readable instructions are provided, the computer-readable instructions, when executed by one or more processors, causing the one or more processors to perform the foregoing method for establishing a call connection.

According to still another aspect of the embodiments of this application, an electronic device is provided, including a memory and a processor, the memory storing computer-readable instructions, the computer-readable instructions, when executed by the processor, causing the processor to perform the foregoing method for establishing a call connection.

Details of one or more embodiments of this application are provided in the subsequent accompanying drawings and descriptions. Other features, objectives, and advantages of this application are illustrated in the specification, the accompanying drawings, and the claims.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, claims, and accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

According to an aspect of the embodiments of this application, a method for establishing a call connection is provided. In some embodiments, the method for establishing a call connection may be applied to, but not limited to, an environment shown in FIG. 1.

Figure 1:
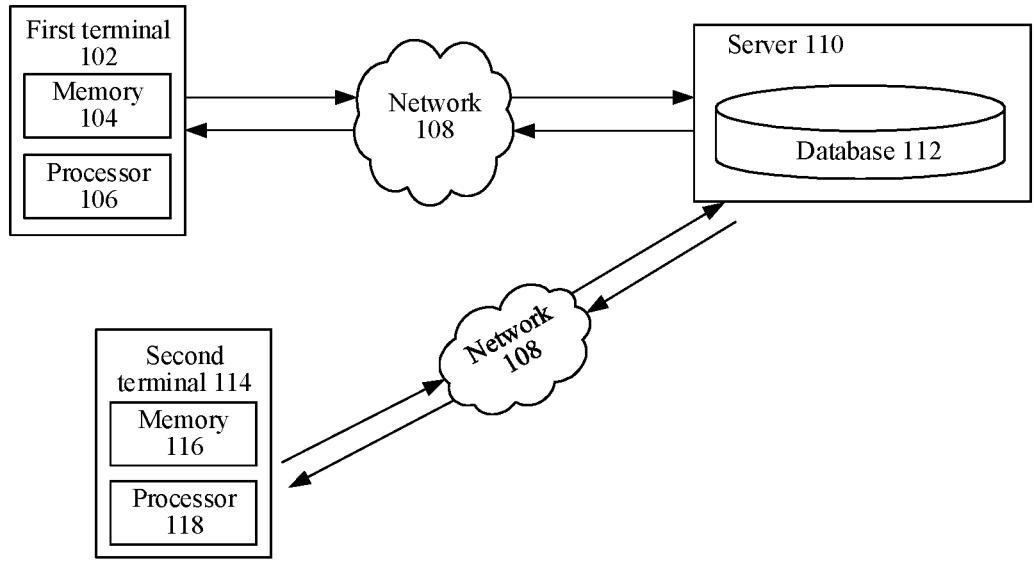
FIG. 1 is a schematic diagram of an application environment of a method for establishing a call connection according to an embodiment of this application.

In FIG. 1, a first terminal 102 includes a memory 104 configured to store interaction data, and a processor 106 configured to process the interaction data. The first terminal 102 may exchange data with a server 110 by using a network 108. The server 110 includes a database 112 configured to store interaction data. In FIG. 1, a second terminal 114 includes a memory 116 configured to store interaction data, and a processor 118 configured to process the interaction data. The second terminal 114 may exchange data with the server 110 by using the network 108. The first terminal 102 requests to establish a first call connection to the second terminal. In this case, the first terminal 102 obtains a second vocoder list of the second terminal 114 by using the server 110, and the first terminal 102 determines a first vocoder with the highest priority among vocoders that exist in both a first vocoder list of the first terminal 102 and the second vocoder list, and requests, by using the first vocoder, to establish the first call connection to the second terminal 114. The second terminal 114 receives the first vocoder list transmitted by the first terminal, and replies with the first vocoder to the request transmitted by the first terminal 102 to establish the first call connection.

In this embodiment, the first terminal obtains the second vocoder list of the second terminal, and determines, by using the first vocoder list and the second vocoder list, the first vocoder supported by both the first terminal and the second terminal and with the highest priority to establish the call connection to the second terminal, so that the optimal vocoder can be selected to establish the call connection to the second terminal, thereby improving efficiency of establishing the call connection.

The first terminal 102 or the second terminal 114, as well as a third terminal mentioned below, may include, but not limited to, a hardware device using an iOS operating system, a Windows operating system, or an Android operating system, for example, a mobile phone or a computer; or a TDM device, for example, a voice call device such as an analog phone; or may include a device such as an IP-based digital phone.

The first terminal 102 or the second terminal 114, as well as the third terminal mentioned below, may include an audio acquisition and playback hardware device, such as a microphone and a speaker, and include a device connected to a network in a wired or wireless manner for data transmission, and may include a software system installed on the hardware and supporting Voice over Internet Protocol (VoIP)-based voice calls, including but not limited to an operating system, audio acquisition and playback drives, a software algorithm for audio signal processing, an application integrating standard or proprietary VoIP signaling, and the like.

The first terminal 102 or the second terminal 114, as well as the third terminal mentioned below, accesses the network 108 in a wired or wireless manner. The network 108 includes, but not limited to, access devices of a conventional mobile phone and a fixed-line phone, a public switched telephone network (PSTN) and a gateway device, a network connection device accessed by an IP terminal by using an enterprise or home wired network or a Wi-Fi network, and a voice gateway device, an access network device accessing the Internet by using a mobile internet device through 3G, 4G, and the like, and the like. The server 110 includes a VoIP-related call control server, media gateway server, application server, and the like of an operator or an enterprise, to implement call control, audio stream processing, and various service operations.

The first terminal 102 or the second terminal 114, as well as the third terminal mentioned below, may integrate one or more of the following vocoders: a super-definition vocoder, including but not limited to vocoders such as Opus, EVS, and AAC-LD that support encoding and decoding of an audio signal at a sampling rate higher than 16 kHz; and broadband and narrowband vocoders, the broadband vocoder including but not limited to vocoders such as SILK-WB, G722, AMR-WB, and EVRC-NW-16 that support encoding and decoding of an audio signal at a sampling rate of 16 kHz, and the narrowband vocoder including but not limited to vocoders such as SILK-NB, Opus-NB, a G729 series, G723.1, G711a, G711u, EVRC, and GSM that support encoding and decoding of an audio signal at a sampling rate lower than 16 kHz.

The first terminal 102 or the second terminal 114, as well as the third terminal mentioned below, further includes an audio acquisition and playback device such as a microphone and a speaker, and may integrate hardware or software modules for echo cancellation, noise suppression, gain control, and sound effect processing on an audio signal, to process audio signals in a VoIP call process, thereby improving user experience; and include software that supports a VoIP function. The software includes a signaling system that supports VoIP call control, including but not limited to a standard protocol and a proprietary protocol such as H.323 and SIP. The software further supports various transmission protocols, for example, a Transmission Control Protocol/Internet Protocol (TCP/IP), a User Datagram Protocol (UDP), a Real-time Transport Protocol/Real-time Transport Control Protocol (RTP/RTCP), and other standard protocols or proprietary protocols.

The server 110 may include one or more physical server hosts and a network thereof, which can implement a VoIP call control and management function, a media processing function such as audio transcoding and audio mixing, channel and source quality monitoring and statistics collection, service operation management, and other functions.

In this solution, the first terminal initiates a call request to the server through a VoIP user interface, the server parses signaling to obtain information such as an IP address of the caller, and transmits a call invitation to the second terminal, and the second terminal answers or rejects the call. The server allocates physical resources, such as a physical channel, a memory, and a CPU to support data exchange and processing; and allocates logical resources, such as a logical channel, a virtual room, and a service number to support link and service management. The entire call initiation and establishment process may be completed through a standard protocol or a proprietary protocol such as SIP, which is not limited herein.

Figure 2:
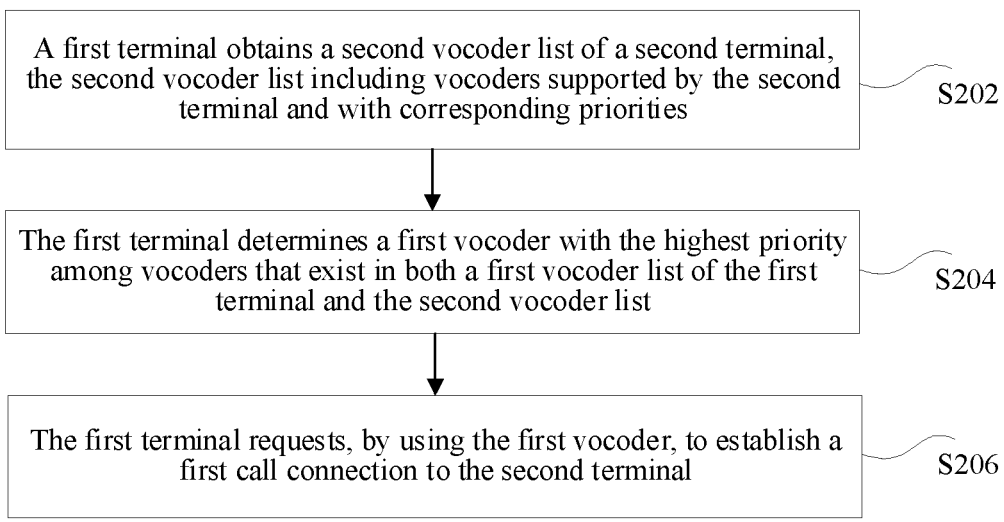
FIG. 2 is a schematic flowchart of a method for establishing a call connection according to an embodiment of this application.

In some embodiments, as shown in FIG. 2, the method for establishing a call connection includes the following steps:

S202. A first terminal obtains a second vocoder list of a second terminal, the second vocoder list including vocoders supported by the second terminal and with corresponding priorities.

S204. The first terminal determines a first vocoder with the highest priority among vocoders that exist in both a first vocoder list of the first terminal and the second vocoder list. The first vocoder list includes vocoders supported by the first terminal and with corresponding priorities. Priorities of the vocoders are positively correlated with audio frequencies in encoding and decoding of the vocoders. That is, in the first vocoder list, a vocoder with a higher audio frequency has a higher priority in the first vocoder list. In the second vocoder list, a vocoder with a higher audio frequency has a higher priority in the second vocoder list.

S206. The first terminal requests, by using the first vocoder, to establish a first call connection to the second terminal.

In some embodiments, the method may be applied to a process of establishing a call connection between two parties or establishing call connections between a plurality of parties pairwise.

In some embodiments, in this solution, when the call connection is established between the first terminal and the second terminal, data may be transferred by using the server.

For example, a call connection is established between two parties. As shown in steps S302 to S312 in FIG. 3, a call connection is established between a first terminal 302 and a second terminal 304 by using a server 306. The first terminal 302 transmits a first vocoder list of the first terminal 302 to the second terminal 304, the second terminal 304 transmits a second vocoder list of the second terminal 304 to the first terminal 302, the first terminal 302 determines a first vocoder and requests, by using the first vocoder, to establish a first call connection to the second terminal 304, and the second terminal 304 determines the first vocoder, and replies with the first vocoder to the request of the first terminal 302 to establish the first call connection. Therefore, the first call connection is established between the first terminal 302 and the second terminal 304 by using the first vocoder supported by both and with the highest priority. In the first terminal 302 and the second terminal 304, a terminal that initiates a call establishment request is the terminal that uses the first vocoder to request to establish the first call connection. A terminal that responds to the call establishment request is the terminal that uses the first vocoder to reply to the request to establish the first call connection. After the first call connection is established between the first terminal 302 and the second terminal 304, the first terminal 302 and the second terminal 304 need to further monitor whether the vocoder is changed. If it is detected that the vocoder is changed, a step of switching vocoders or a step of re-determining a vocoder is performed.

For example, a user terminal 1 as a calling party initiates a call request to a user terminal 2, which carries information about a supported vocoder list, for example, transmits an INVITE message through an SIP protocol, which carries information about a supported vocoder type through an SDP protocol. The server parses the message but does not specify a vocoder type, and forwards the vocoder list information to a called party, that is, the user terminal 2. The user terminal 2 determines a vocoder that the user terminal 2 needs to use according to the received vocoder list information of the calling party. Similarly, the user terminal 2 also transmits information about a vocoder list supported by the user terminal 2 to the user terminal 1, and the user terminal 1 determines a vocoder to be used according to the list information. After the called party replies, a call is established between the two parties.

A description is made below with reference to three specific examples.

Example 1

Both the user terminal 1 and the user terminal 2 support a series of vocoders including a super-definition vocoder and broadband and narrowband vocoders, the super-definition vocoder being prioritized. For example, both support Opus, SILK-WB, SILK-NB, G729, G711a, and G711u, and according to this sequence, Opus has the highest priority and G711u has the lowest priority. After receiving the vocoder list transmitted by the user terminal 1, the user terminal 2 determines that all the vocoders in the list can be supported, and selects the Opus vocoder according to the priority sequence for a call. According to this logic, the user terminal 1 may also select Opus as a vocoder for a call between the two parties.

Example 2

The user terminal 1 supports a series of vocoders including a super-definition vocoder and broadband and narrowband vocoders, the super-definition vocoder being prioritized. The user terminal 2 does not support the super-definition vocoder. For example, the user terminal 1 supports Opus, SILK-WB, SILK-NB, G729, G711a, and G711u, and according to this sequence, Opus has the highest priority and G711u has the lowest priority. The user terminal 2 supports SILK-WB, SILK-NB, G729, G711a, and G711u, and according to this sequence, SILK-WB has the highest priority and G711u has the lowest priority. After receiving the vocoder list transmitted by the user terminal 1, the user terminal 2 determines that a vocoder list that can be supported by both includes SILK-WB, SILK-NB, G729, G711a, and G711u, and selects the SILK-WB vocoder according to the priority sequence for a call. According to this logic, the user terminal 1 may also select SILK-WB as a vocoder for a call between the two parties.

Example 3

The user terminal 1 supports a series of vocoders including a super-definition vocoder and broadband and narrowband vocoders, the super-definition vocoder being prioritized. The user terminal 2 supports only a narrowband vocoder. For example, the user terminal 1 supports Opus, SILK-WB, SILK-NB, G729, G711a, and G711u, and according to this sequence, Opus has the highest priority and G711u has the lowest priority. The user terminal 2 supports G711u. After receiving the vocoder list transmitted by the user terminal 1, the user terminal 2 determines that a vocoder list that can be supported by both includes G711u, and selects the G711u vocoder according to the priority sequence for a call. According to this logic, the user terminal 1 may also select G711u as a vocoder for a call between the two parties.

After the call is established between the two parties, the user terminal 1 and the user terminal 2 exchange voice data in real time through a protocol such as UDP, RTP, or RTCP, and exchange information about the supported vocoder type in real time. When a vocoder type of either party changes due to reasons such as a network condition or an application requirement, the other party detects the change and re-enables the foregoing logic of selecting a first vocoder to select an optimal vocoder supported by both parties for a call.

In some embodiments, in this solution, after the first call connection is established between the first terminal and the second terminal, a new terminal may be added to establish call connections to the first terminal and the second terminal. For example, after the first terminal establishes the first call connection to the second terminal, a third terminal is newly added, the first terminal establishes a second call connection to the third terminal, and the second terminal establishes a third call connection to the third terminal.

In this process, both the first terminal and the second terminal need to obtain a third vocoder list of the third terminal, and transmit the first vocoder list of the first terminal and the second vocoder list of the second terminal to the third terminal. The first terminal selects a vocoder included in the first vocoder list, the second vocoder list, and the third vocoder list and with the highest priority as a second vocoder, and establishes the second call connection to the third terminal by using the second vocoder. If the second vocoder is different from the first vocoder, the first terminal needs to switch the first vocoder for the call to the second terminal to the second vocoder, and the second terminal also needs to switch the first vocoder to the second vocoder. The third terminal replies with the second vocoder to requests of the first terminal and the second terminal to establish the call connections. Therefore, the call connections are established between the three parties pairwise by using the second vocoder.

Figure 4:
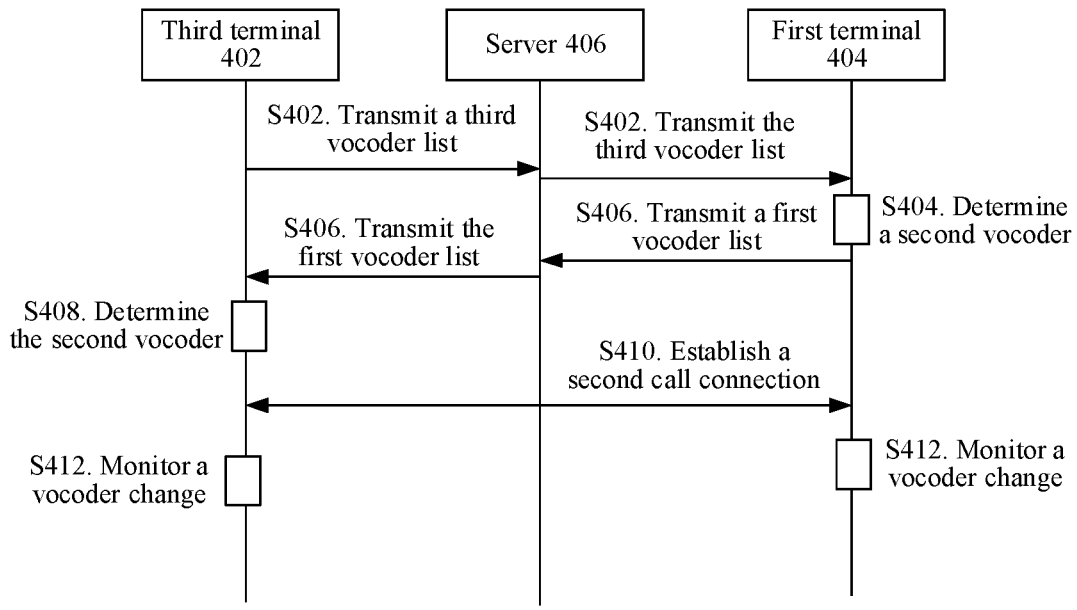
FIG. 4 is a schematic diagram of another method for establishing a call connection according to an embodiment of this application.

A description is made below by using data exchange between a first terminal 404 and a third terminal 402 after the first terminal 404 establishes a first call connection to a second terminal (data exchange between the second terminal and the third terminal 402 is the same as the data exchange between the first terminal 404 and the third terminal 402). As shown in steps S402 to S412 in FIG. 4, the third terminal 402 transmits a third vocoder list to the first terminal 404 after the first terminal 404 establishes the call connection to the second terminal, the first terminal 404 determines a second vocoder, the first terminal 404 transmits a first vocoder list of the first terminal 404 to the third terminal 402, the third terminal 402 determines the second vocoder, and the first terminal 404 establishes a second call connection to the third terminal 402 by using the second vocoder. During establishment of the second call connection, a calling party uses the second vocoder to initiate an establishment request, and a called party uses the second vocoder to reply to the establishment request. The first terminal 404 switches a first vocoder for the first call connection to the second terminal to the second vocoder, and keeps monitoring whether the vocoder is changed. After the second call connection is established between the third terminal 402 and the first terminal 404, the third terminal 402 keeps monitoring whether the vocoder is changed (a third call connection is established between the second terminal and the third terminal 402).

Figure 5:
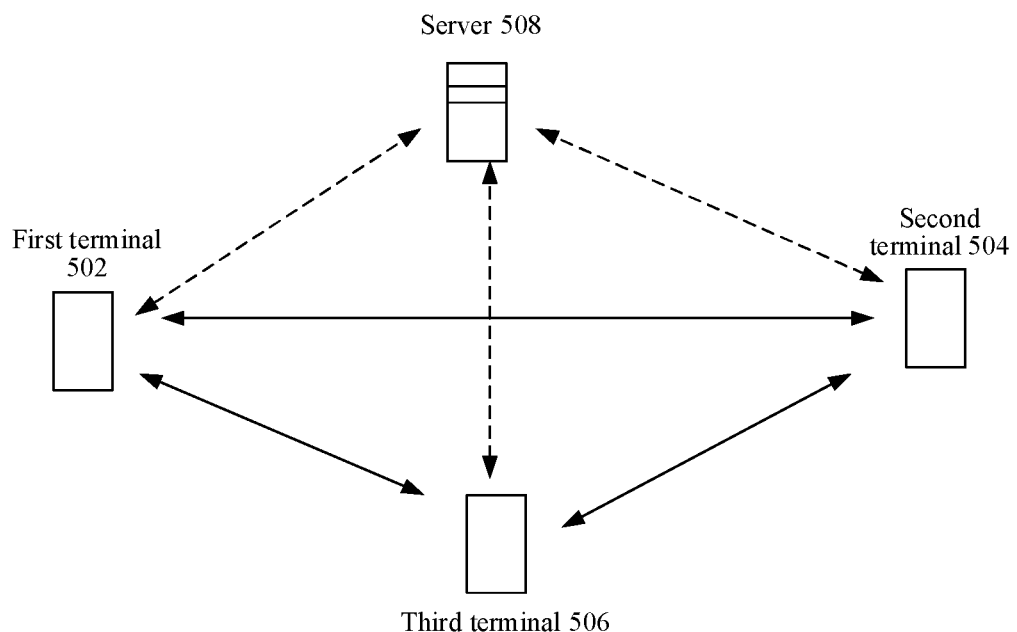
FIG. 5 is a schematic diagram of still another method for establishing a call connection according to an embodiment of this application.

As shown in FIG. 5, FIG. 5 is a schematic diagram of establishing call connections between a first terminal 502, a second terminal 504, and a third terminal 506 pairwise by using a server 508.

After a call is established, the server 508 may not decode or process an audio data signal (bitstream data) encoded by a vocoder, but may connect the user terminals by allocating physical and logical channels, such as establishing a virtual chat room. The user terminals exchange, with each other through the server by using a real-time transmission protocol such as UDP, RTP, or RTCP, bitstream data encoded by a vocoder, decode received bitstream data by using the vocoder to obtain an audio stream, and play the bitstream data by using an audio playback device.

In some embodiments, after receiving second audio data transmitted by the second terminal 504 through a first call connection and third audio data transmitted by the third terminal 506 through a second call connection, the first terminal 502 performs an audio mixing operation on the second audio data and the third audio data and performs playback. For example, the first terminal may receive bitstream data of all other user terminals, and thus needs to decode the bitstream data of all the other user terminals and perform an audio mixing operation before playback. For example, the first terminal 502 receives bitstream data encoded by Opus vocoders from the second terminal 504 and the third terminal 506 in real time, decodes the two channels of bitstream data by using an Opus vocoder, performs an audio mixing operation on two channels of voice data obtained through the decoding, to obtain one channel of real-time audio stream data, and transmits the real-time audio stream data to an audio playback device for playback.

In this embodiment, a method is used, including: requesting, by a first terminal, to establish a first call connection to a second terminal; obtaining, by the first terminal, a second vocoder list of the second terminal, the second vocoder list including vocoders supported by the second terminal and with corresponding priorities; determining, by the first terminal, a first vocoder with the highest priority among vocoders that exist in both a first vocoder list of the first terminal and the second vocoder list, the first vocoder list including vocoders supported by the first terminal and with corresponding priorities, priorities being assigned to the vocoders in the first vocoder list and the second vocoder list according to audio frequencies in encoding and decoding of the vocoders, and a vocoder with a higher audio frequency allowed in encoding and decoding having a higher priority; and requesting, by the first terminal by using the first vocoder, to establish the first call connection to the second terminal. Therefore, the first terminal obtains the second vocoder list of the second terminal, and determines, by using the first vocoder list and the second vocoder list, the first vocoder supported by both the first terminal and the second terminal and with the highest priority to establish the call connection to the second terminal, so that the optimal vocoder can be selected to establish the call connection to the second terminal, thereby improving efficiency of establishing the call connection.

In one implementation, before the requesting, by the first terminal by using the first vocoder, to establish a first call connection to the second terminal, the method further includes:

S1. transmitting, by the first terminal, the first vocoder list of the first terminal to the second terminal, so that the second terminal determines the first vocoder with the highest priority among the vocoders that exist in both the first vocoder list and the second vocoder list, and replies with the first vocoder to the request of the first terminal to establish the first call connection.

In this embodiment, the first vocoder of the first terminal is transmitted to the second terminal, so that the second terminal may use the first vocoder to reply to the request, thereby improving efficiency of establishing the call connection between the first terminal and the second terminal.

In one implementation, after the requesting, by the first terminal by using the first vocoder, to establish a first call connection to the second terminal, the method further includes:

S1. establishing the first call connection between the first terminal and the second terminal;

S2. receiving, by the first terminal, a third vocoder list transmitted by a third terminal, the third vocoder list including vocoders supported by the third terminal and with corresponding priorities, and the priorities being positively correlated with audio frequencies in encoding and decoding of the vocoders in the third vocoder list;

S3. determining, by the first terminal, a second vocoder with the highest priority among vocoders that exist in the first vocoder list, the second vocoder list, and the third vocoder list; and S4. switching, by the first terminal, the first vocoder to the second vocoder, and requesting, by the first terminal by using the second vocoder, to establish a second call connection to the third terminal.

In this embodiment, through the foregoing method, the efficiency of establishing the call connection between the first terminal and the second terminal is improved, while pairwise call connection establishment between a plurality of terminals is implemented, thereby improving efficiency of establishing call connections between the plurality of terminals.

In one implementation, before the requesting, by the first terminal by using the second vocoder, to establish a second call connection to the third terminal, the method further includes:

S1. transmitting, by the first terminal, the first vocoder list of the first terminal to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

In this embodiment, through the foregoing method, the efficiency of establishing the call connection between the first terminal and the second terminal is improved, while pairwise call connection establishment between a plurality of terminals is implemented, thereby improving efficiency of establishing call connections between the plurality of terminals.

In one implementation, after the requesting, by the first terminal by using the second vocoder, to establish a second call connection to the third terminal, the method further includes:

S1. receiving, by the first terminal, second audio data of the second terminal by using the first call connection, and receive third audio data of the third terminal by using the second call connection;

S2. performing, by the first terminal, an audio mixing operation on the second audio data and the third audio data, to obtain an audio mixing result; and S3. playing, by the first terminal, the audio mixing result.

In this embodiment, through the foregoing method, the audio mixing result of the audio data is obtained, and the audio mixing result is played, thereby improving the efficiency of establishing the call connection between the first terminal and the second terminal, while improving flexibility of audio mixing.

For ease of description, the foregoing method embodiments are stated as a combination of a series of action combinations. However, a person skilled in the art is to learn that this application is not limited to the described action sequence, because according to this application, some steps may be performed in another sequence or simultaneously. In addition, a person skilled in the art is also to understand that the embodiments described in this specification are all exemplary embodiments, and the involved actions and modules are not necessarily required to this application.

Figure 6:
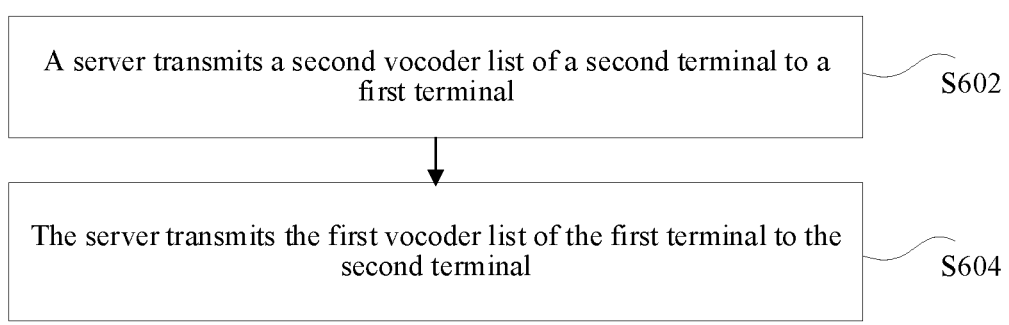
FIG. 6 is a schematic flowchart of another method for establishing a call connection according to an embodiment of this application.

According to another aspect of the embodiments of this application, a method for establishing a call connection is further provided. As shown in FIG. 6, the method includes the following steps:

S602. A server transmits a second vocoder list of a second terminal to a first terminal, so that the first terminal determines a first vocoder with the highest priority among vocoders that exist in both a first vocoder list of the first terminal and the second vocoder list, and requests, by using the first vocoder, to establish a first call connection to the second terminal, the second vocoder list including vocoders supported by the second terminal and with corresponding priorities, the first vocoder list including vocoders supported by the first terminal and with corresponding priorities, and in the first vocoder list and the second vocoder list, the priorities of the vocoders being positively correlated with audio frequencies in encoding and decoding of the vocoders.

S604. The server transmits the first vocoder list of the first terminal to the second terminal, so that the second terminal determines the first vocoder with the highest priority among the vocoders that exist in both the first vocoder list and the second vocoder list of the second terminal, and replies with the first vocoder to the request of the first terminal to establish the first call connection.

In some embodiments, the foregoing method may be applied to, but not limited to, the server 110 shown in FIG. 1.

The first terminal 102 requests to establish the first call connection to the second terminal. In this case, the first terminal 102 obtains the second vocoder list of the second terminal 114 by using the server 110, and the first terminal 102 obtains the first vocoder with the highest priority among the vocoders that exist in both the first vocoder list of the first terminal 102 and the second vocoder list, and requests, by using the first vocoder, to establish the first call connection to the second terminal 114. The second terminal 114 receives the first vocoder list transmitted by the first terminal, and replies with the first vocoder to the request transmitted by the first terminal 102 to establish the first call connection.

Figure 3:
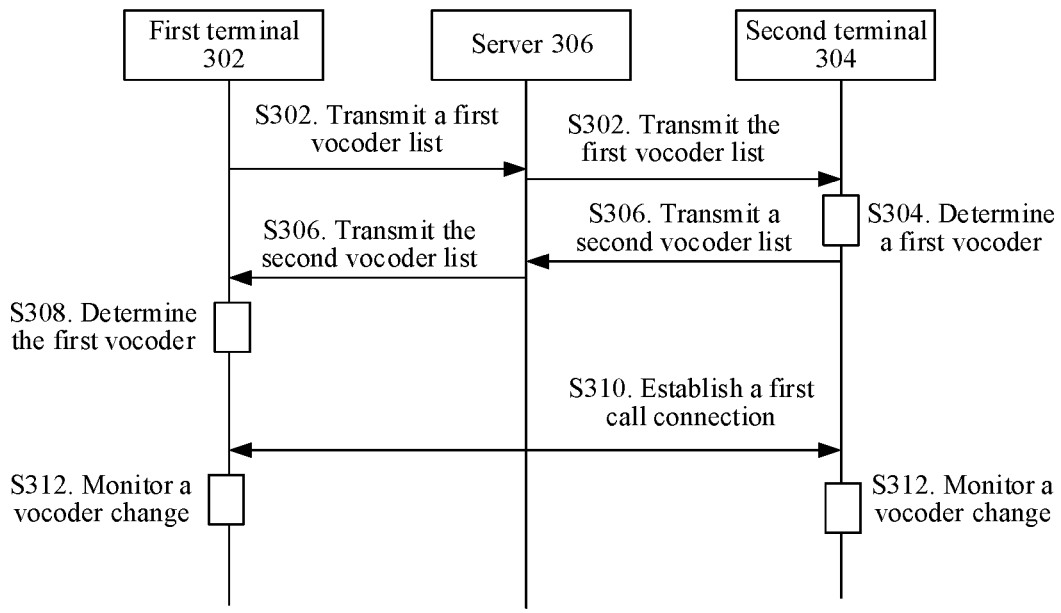
FIG. 3 is a schematic diagram of a method for establishing a call connection according to an embodiment of this application.

For example, as shown in steps S302 to S312 in FIG. 3, a call connection is established between a first terminal 302 and a second terminal 304 by using a server 306, the first terminal 302 transmits a first vocoder list of the first terminal 302 to the second terminal 304, the second terminal 304 transmits a second vocoder list of the second terminal 304 to the first terminal 302, the first terminal 302 determines a first vocoder and requests, by using the first vocoder, to establish a first call connection to the second terminal 304, and the second terminal 304 determines the first vocoder, and replies with the first vocoder to the request of the first terminal 302 to establish the first call connection. Therefore, the first call connection is established between the first terminal 302 and the second terminal 304 by using the first vocoder supported by both and with the highest priority. In the first terminal 302 and the second terminal 304, a terminal that initiates a call establishment request is the terminal that uses the first vocoder to request to establish the first call connection. A terminal that responds to the call establishment request is the terminal that uses the first vocoder to reply to the request to establish the first call connection. After the first call connection is established between the first terminal 302 and the second terminal 304, the first terminal 302 and the second terminal 304 need to further monitor whether the vocoder is changed. If it is detected that the vocoder is changed, a step of switching vocoders or a step of re-determining a vocoder is performed.

After the first terminal establishes the first call connection to the second terminal, if there is another terminal such as a third terminal requesting to establish call connections to the first terminal and the second terminal, the server needs to receive the first vocoder list of the first terminal and transmit the first vocoder list to the third terminal, receive the second vocoder list of the second terminal and transmit the second vocoder list to the third terminal, and receive a third vocoder list of the third terminal and transmit the third vocoder list to the first terminal and the second terminal.

The three terminals use a vocoder included in the three vocoder lists and with the highest priority to establish call connections pairwise. A result of establishing the call connections may be shown in FIG. 5.

After a call is established, the server may not decode or process an audio data signal (bitstream data) encoded by the vocoder, but may connect the user terminals by allocating physical and logical channels, such as establishing a virtual chat room. The user terminals exchange, with each other through the server by using a real-time transmission protocol such as UDP, RTP, or RTCP, bitstream data encoded by a vocoder, decode received bitstream data by using the vocoder to obtain an audio stream, and play the bitstream data by using an audio playback device.

In this embodiment, a call connection is established by using the foregoing method. Therefore, the first terminal obtains the second vocoder list of the second terminal, and determines, by using the first vocoder list and the second vocoder list, the first vocoder supported by both the first terminal and the second terminal and with the highest priority to establish a call connection to the second terminal, or the first terminal establishes call connections to the second terminal and the third terminal by using the second vocoder, so that the optimal vocoder can be selected to establish the call connection to the second terminal, thereby improving efficiency of establishing the call connection.

In one implementation, after the first terminal establishes the first call connection to the second terminal, the method further includes:

S1. receiving, by the server, a third vocoder list of a third terminal, the third vocoder list including vocoders supported by the third terminal and with corresponding priorities, and in the third vocoder list, the priorities of the vocoders being positively correlated with audio frequencies in encoding and decoding of the vocoders; and S2. transmitting, by the server, the third vocoder list to the first terminal and the second terminal, and transmitting the first vocoder list and the second vocoder list to the third terminal.

In this embodiment, through the foregoing method, the efficiency of establishing the first call connection between the first terminal and the second terminal is improved, a multi-party call is further implemented, and efficiency of establishing connections during the multi-party call is improved.

Figure 7:
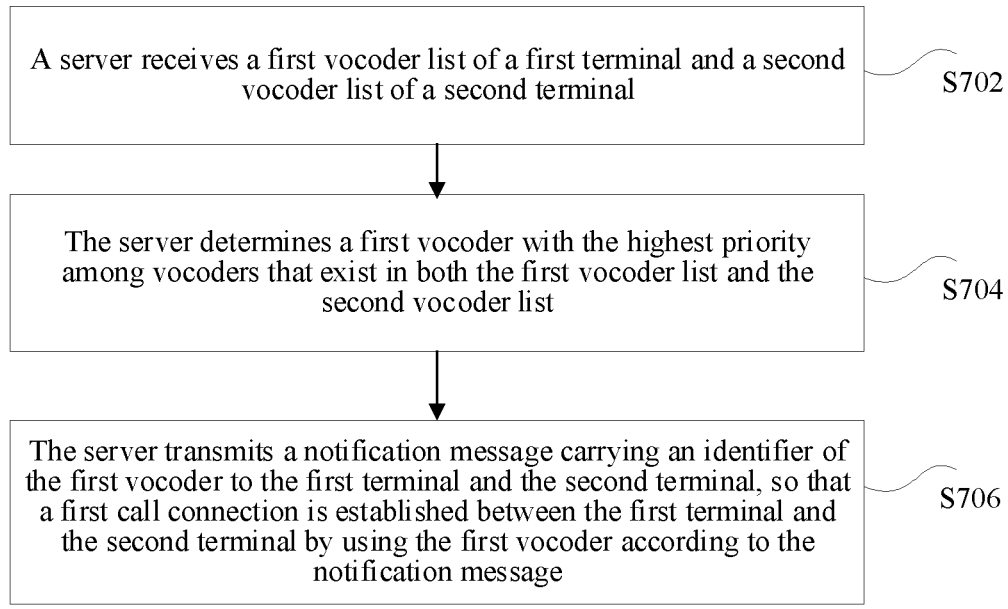
FIG. 7 is a schematic flowchart of still another method for establishing a call connection according to an embodiment of this application.

According to still another aspect of the embodiments of this application, a method for establishing a call connection is further provided. As shown in FIG. 7, the method includes the following steps:

S702. A server receives a first vocoder list of a first terminal and a second vocoder list of a second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders.

S704. The server determines a first vocoder with the highest priority among vocoders that exist in both the first vocoder list and the second vocoder list.

S706. The server transmits a notification message carrying an identifier of the first vocoder to the first terminal and the second terminal, so that a first call connection is established between the first terminal and the second terminal by using the first vocoder according to the notification message.

Figure 8:
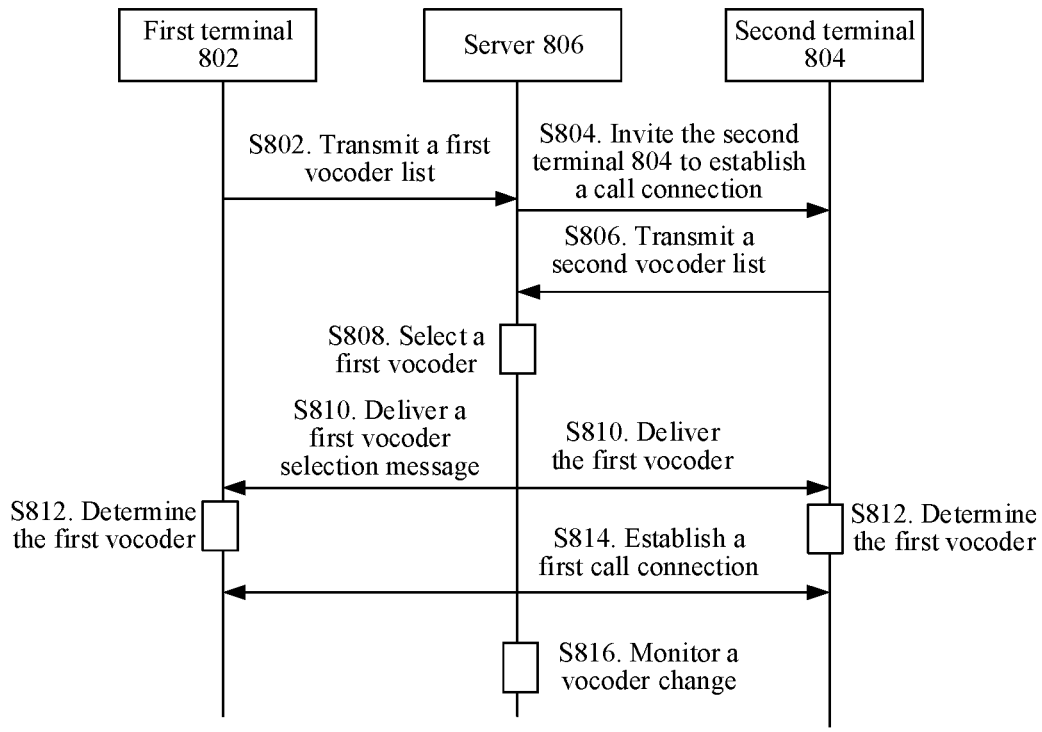
FIG. 8 is a schematic diagram of still another method for establishing a call connection according to an embodiment of this application.

In some embodiments, the method in this embodiment may be applied to a process of establishing a call connection between the first terminal and the second terminal. As shown in steps S802 to S816 in FIG. 8, in this solution, a call connection is established between a first terminal 802 and a second terminal 804 by using a server 806. The first terminal transmits a first vocoder list to the server, the second terminal transmits a second vocoder list to the server, and the server determines, according to the first vocoder list and the second vocoder list, a first vocoder included in the two vocoder lists and with the highest priority, and delivers a first vocoder message to the first terminal and the second terminal. The first terminal and the second terminal establish a first call connection by using the first vocoder. The server is responsible for monitoring a vocoder change. If the vocoder is changed, a second vocoder for the first call connection between the first terminal and the second terminal is determined, and the first terminal and the second terminal switch the first vocoder to the second vocoder.

For example, a user terminal 1 as a calling party initiates a call request to a user terminal 2, which carries information about a supported vocoder list, for example, transmits an INVITE message through an SIP protocol, which carries information about a supported vocoder type through an SDP protocol. The server parses the message and retains the information about the vocoder type supported by the user terminal 1. After receiving call invitation information, the user terminal 2 responds to the call information and transmits information about a supported vocoder type to the server. According to the received vocoder list information of both parties, the server selects a vocoder included in the two vocoder lists and with the highest priority as a first vocoder. The server delivers a message of the selected first vocoder to the parties of the call, and then the user terminal 1 and the user terminal 2 determine a vocoder used according to the vocoder message delivered by the server. After the called party replies, a call is established between the two parties.

The user terminal 1 and the user terminal 2 exchange voice data in real time through a protocol such as UDP, RTP, or RTCP, and transmit vocoder change request information to the server in real time. When a vocoder type of either party changes due to reasons such as a network condition or an application requirement, the server re-enables the foregoing logic of selecting a first vocoder to select an optimal vocoder supported by both parties for a call.

When or after the call is established between the two parties, if a network condition or an application requirement changes, the server may lower or raise a priority of a vocoder, reselect a vocoder supported by both parties according to the foregoing logic of selecting a first vocoder, and deliver new vocoder information to the terminals of the call parties, and the terminals of both parties select or switch to the vocoder for a call according to the delivered vocoder information.

In this embodiment, through the foregoing method, the first call connection is established between the first terminal and the second terminal. Therefore, a call connection can be established between the first terminal and the second terminal by using the vocoder supported by both and with the highest priority, thereby improving efficiency of establishing the call connection.

Figure 9:
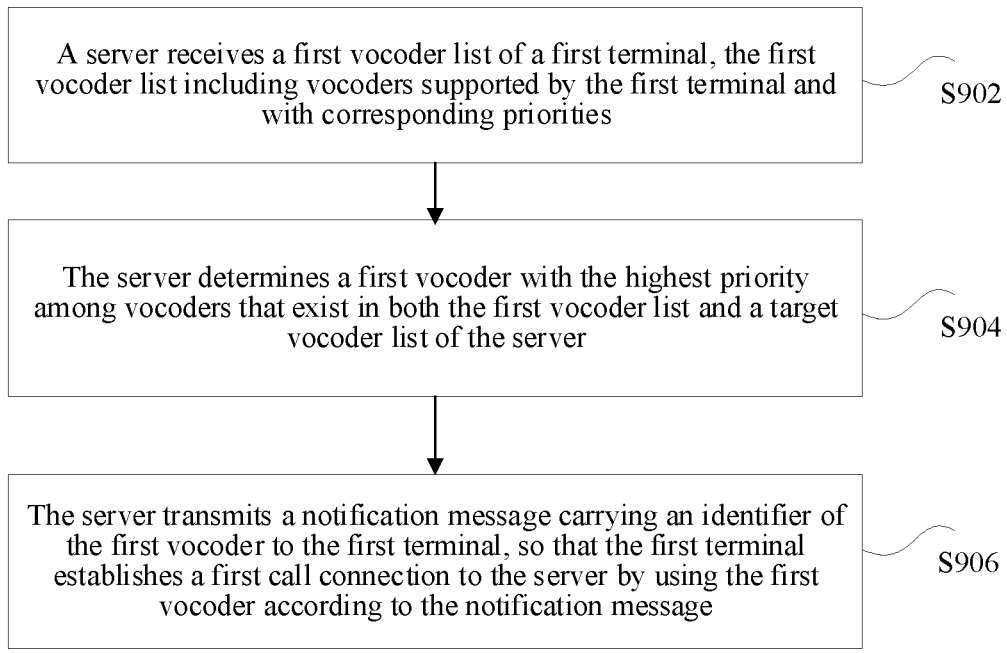
FIG. 9 is a schematic flowchart of still another method for establishing a call connection according to an embodiment of this application.

According to still another aspect of the embodiments of this application, a method for establishing a call connection is further provided. As shown in FIG. 9, the method includes the following steps:

S902. A server receives a first vocoder list of a first terminal, the first vocoder list including vocoders supported by the first terminal and with corresponding priorities.

S904. The server determines a first vocoder with the highest priority among vocoders that exist in both the first vocoder list and a target vocoder list of the server, the target vocoder list including vocoders supported by the server and with corresponding priorities, and in the first vocoder list and the target vocoder list, the priorities of the vocoders being positively correlated with audio frequencies in encoding and decoding of the vocoders.

S906. The server transmits a notification message carrying an identifier of the first vocoder to the first terminal, so that the first terminal establishes a first call connection to the server by using the first vocoder according to the notification message.

Figure 10:
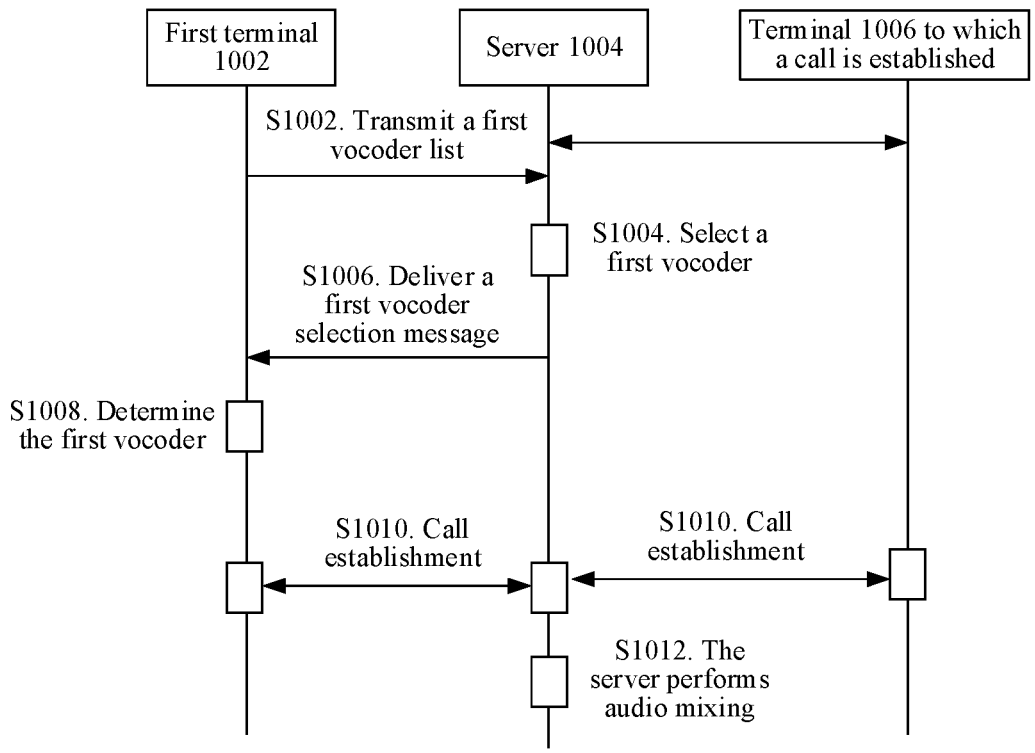
FIG. 10 is a schematic flowchart of still another method for establishing a call connection according to an embodiment of this application.

In some embodiments, this solution may be applied to a process of a multi-party voice call. In this solution, any terminal in the multi-party call may interact with the server by using a method shown in FIG. 10. For example, a first terminal 1002 interacts with a server 1004. As shown in steps S1002 to S1012 in FIG. 10, the first terminal transmits a first vocoder list of the first terminal to the server, the server determines a first vocoder included in both the first vocoder list and a target vocoder list of the server and with the highest priority, and delivers a first vocoder message, and the first terminal determines to use the first vocoder to establish a call connection to the server. The server may establish a call connection to each terminal in the multi-party call by using the foregoing method. In this process, the server 1004 may exchange data with the terminal 1006 to which a call is established.

Figure 11:
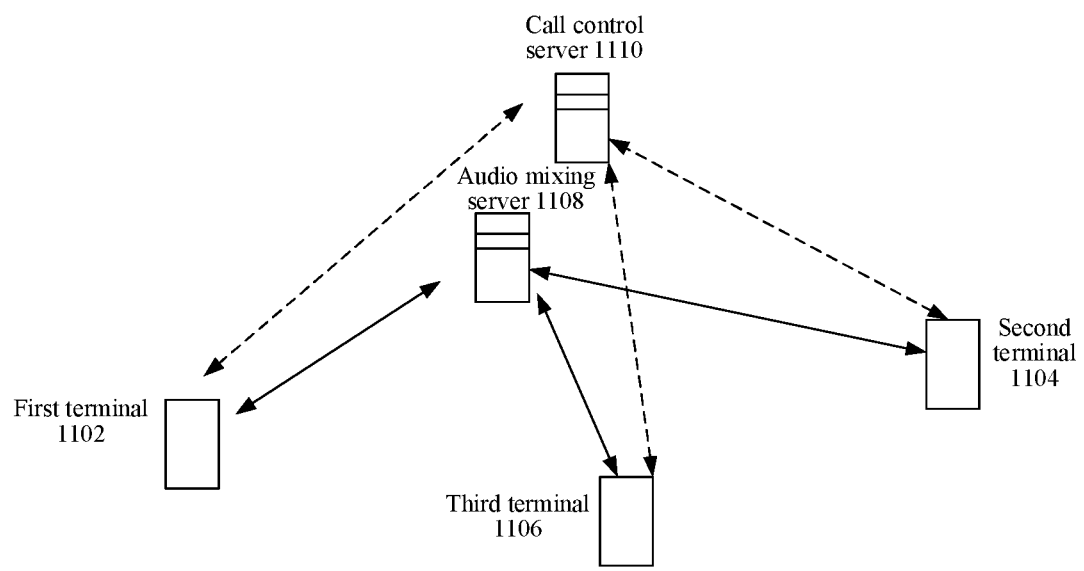
FIG. 11 is a schematic diagram of still another method for establishing a call connection according to an embodiment of this application.

In some embodiments, the server in this solution includes a call control server and an audio mixing server. Using a three-party call as an example, established connections may be shown in FIG. 11. A call control server 1110 is responsible for establishing call connections between a first terminal 1102, a second terminal 1104, and a third terminal 1106, and an audio mixing server 1108 is responsible for performing an audio mixing operation.

When the server has established a call connection to a terminal, for a newly added terminal, after receiving a vocoder list from the newly added terminal device, the server compares the vocoder list with a vocoder list supported by the server, selects a vocoder list supported by both parties, and selects a vocoder according to a priority sequence as a vocoder for both parties to transmit an audio bitstream. After determining the vocoder to be used, the server decodes a bitstream from the newly added terminal device and transmits an audio signal obtained through the decoding for audio mixing; and encodes, by using the determined vocoder, an audio signal that is obtained through audio mixing and needs to be transmitted to the newly added terminal, and transmits an encoded bitstream to the newly added terminal for decoding and playback.

Three specific examples are as follows:

Example 1

Both the newly added terminal and the server support a series of vocoders including a super-definition vocoder and broadband and narrowband vocoders, the super-definition vocoder being prioritized. For example, both support Opus, SILK-WB, SILK-NB, G729, G711a, and G711u, and according to this sequence, Opus has the highest priority and G711u has the lowest priority. After receiving the vocoder list transmitted by the newly added user terminal, the server determines that all the vocoders in the list can be supported, and selects the Opus vocoder according to the priority sequence for a call. According to vocoder information delivered by the server, the newly added user terminal determines Opus as a vocoder for audio data exchange between the two parties.

Example 2

The server supports a series of vocoders including a super-definition vocoder and broadband and narrowband vocoders, the super-definition vocoder being prioritized. The newly added user terminal does not support the super-definition vocoder. For example, the server supports Opus, SILK-WB, SILK-NB, G729, G711a, and G711u, and according to this sequence, Opus has the highest priority and G711u has the lowest priority. The newly added user terminal supports SILK-WB, SILK-NB, G729, G711a, and G711u, and according to this sequence, SILK-WB has the highest priority and G711u has the lowest priority. After receiving the vocoder list transmitted by the newly added user terminal, the server determines that a vocoder list that can be supported by both includes SILK-WB, SILK-NB, G729, G711a, and G711u, and selects the SILK-WB vocoder according to the priority sequence for audio encoding and decoding. According to vocoder information delivered by the server, the newly added user terminal determines SILK-WB as a vocoder for audio data exchange between the two parties.

Example 3

The server supports a series of vocoders including a super-definition vocoder and broadband and narrowband vocoders, the super-definition vocoder being prioritized. The newly added user terminal supports only a narrowband vocoder. For example, the server supports Opus, SILK-WB, SILK-NB, G729, G711a, and G711u, and according to this sequence, Opus has the highest priority and G711u has the lowest priority. The newly added user terminal supports G711u. After receiving the vocoder list transmitted by the newly added user terminal, the server determines that a vocoder list that can be supported by both includes G711u, and selects the G711u vocoder according to the priority sequence for audio encoding and decoding. According to vocoder information delivered by the server, the newly added user terminal determines G711u as a vocoder for audio data exchange between the two parties.

Because the user terminal may use a narrowband (standard-definition) vocoder, a broadband (high-definition) vocoder, or a super-broadband (super-definition) vocoder, and the three use different sampling rates to encode and decode audio data, whenever the user terminal determines a selected vocoder, the user terminal needs to notify an audio link in a VoIP application, so that an audio functional module therein may provide support for a required sampling rate.

Figure 12:
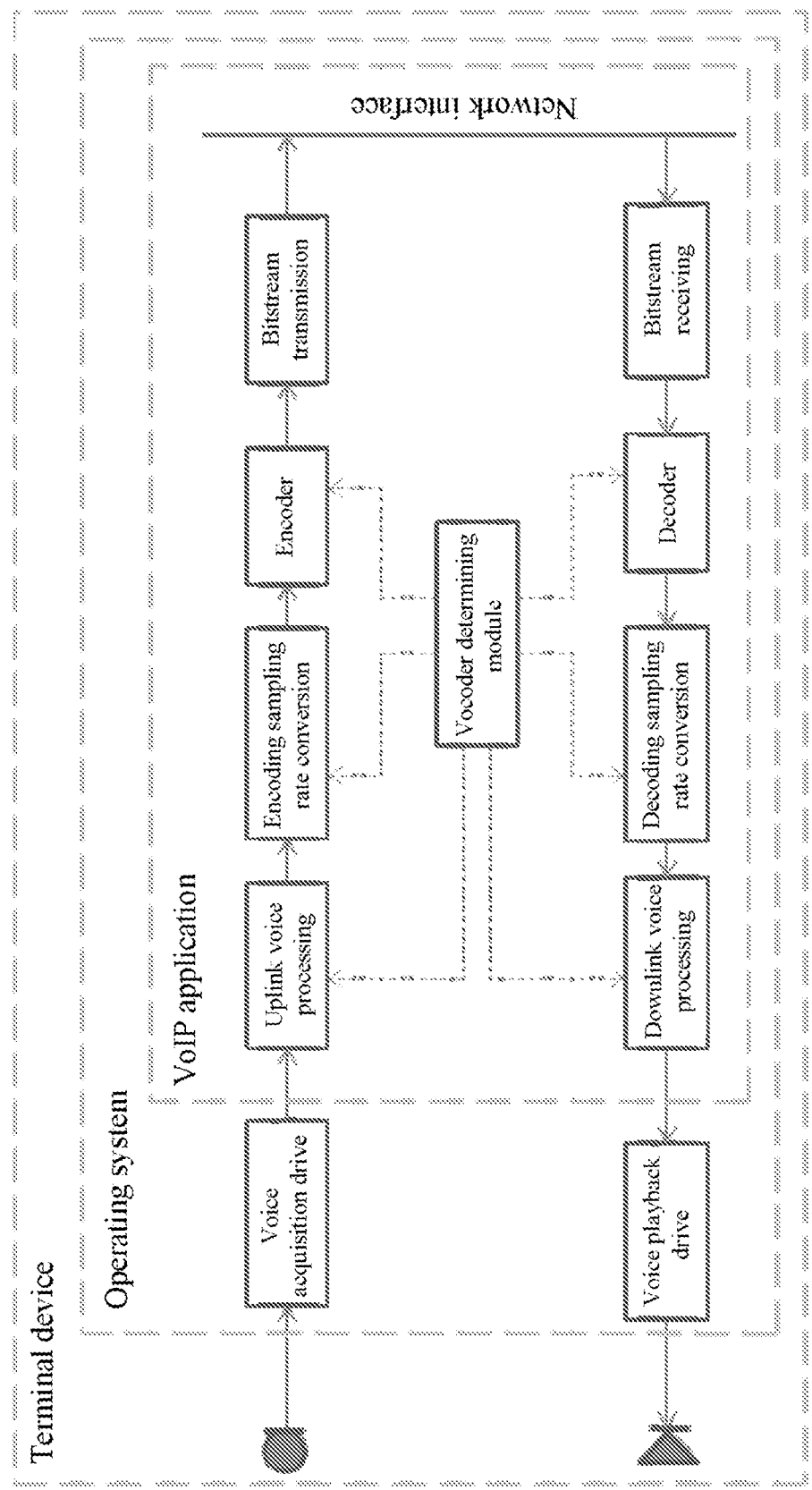
FIG. 12 is a schematic diagram of still another method for establishing a call connection according to an embodiment of this application.

As shown in FIG. 12, to support a VoIP call, a terminal device includes audio acquisition and playback devices such as a microphone and a speaker, and an installed operating system needs to include a corresponding audio device drive. A VoIP application obtains, by using an audio drive interface, uplink audio data acquired by using the microphone, and plays downlink audio data from a network.

For an audio uplink, an uplink voice processing module includes, but not limited to, echo cancellation, speech detection on two ends, noise suppression, gain control, and other signal processing units; an encoding sampling rate conversion module performs, according to requirements of an encoder, sampling rate conversion on an audio signal obtained after the foregoing uplink voice processing; an encoder module is an encoding functional unit of the selected vocoder; and a bitstream transmission module performs operations such as packetizing and framing on a bitstream obtained through encoding by the encoder, and transmits the bitstream to a network interface by using a real-time transmission protocol. The network interface includes a software interface for the VoIP application to call a network device drive of the operating system.

For an audio downlink, a bitstream receiving module receives a network data packet from the network interface and perform operations such as buffering, de packetizing, and error correction, to restore bitstream data transmitted by a remote transmitter as much as possible; a decoder is a decoding functional unit of the selected vocoder, and is configured to decode the received bitstream data to obtain audio data; a decoding sampling rate conversion module performs sampling rate conversion on the decoded audio data to a required sampling rate according to requirements of a terminal audio link; and a downlink voice processing module includes, but not limited to, gain control, remote voice activity detection, energy balance, and other functional units.

For example, the VoIP application on the terminal device uses an audio link with a sampling rate of 48 kHz, and the uplink and downlink voice processing modules support 48 kHz voice signal processing by default. When it is determined to use an Opus vocoder with a sampling rate of 24 kHz during session establishment, a vocoder determining module needs to instruct the encoder and the decoder to use the Opus vocoder with the sampling rate of 24 kHz, instruct the encoding sampling rate conversion module to downsample a 48 kHz audio signal to obtain an audio signal at the sampling rate of 24 kHz, instruct the decoding sampling rate conversion unit to upsample a 24 kHz audio signal to obtain an audio signal at the sampling rate of 48 kHz, and instruct the uplink and downlink voice processing modules to enable voice signal processing functional units that support the sampling rate of 24 kHz.

In this embodiment, through the foregoing method, the first call connection is established between the first terminal and the second terminal, thereby improving efficiency of establishing the call connection.

In one implementation, after the first terminal establishes the call connection to the server, the method further includes:

S1. receiving, by the server, second audio data of a second terminal and third audio data of a third terminal, the second terminal and the third terminal being terminals that each establish a call connection to the server;

S2. performing, by the server, an audio mixing operation on the second audio data and the third audio data, to obtain an audio mixing result; and S3. transmitting, by the server, the audio mixing result to the first terminal.

In this embodiment, the server performs the audio mixing operation on the received audio data to obtain the audio mixing result, and transmits the audio mixing result to the first terminal, thereby improving the efficiency of the call connection, and improving the efficiency of audio mixing.

Figure 13:
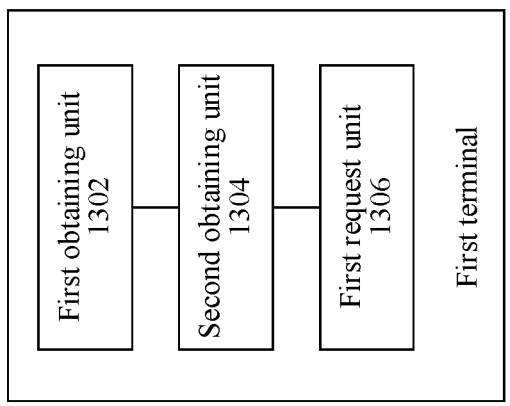
FIG. 13 is a schematic structural diagram of a first terminal according to an embodiment of this application.

According to still another aspect of the embodiments of this application, a first terminal configured to perform the foregoing method for establishing a call connection is further provided. As shown in FIG. 13, the first terminal includes:

(1) a first obtaining unit 1302, configured to obtain a second vocoder list of a second terminal, the second vocoder list including vocoders supported by the second terminal and with corresponding priorities;

(2) a second obtaining unit 1304, configured to obtain a first vocoder with the highest priority among vocoders that exist in both a first vocoder list of the first terminal and the second vocoder list, the first vocoder list including vocoders supported by the first terminal and with corresponding priorities, and in the first vocoder list and the second vocoder list, the priorities of the vocoders being positively correlated with audio frequencies in encoding and decoding of the vocoders; and (3) a first request unit 1306, configured to request, by using the first vocoder, to establish a first call connection to the second terminal.

In some embodiments, the foregoing method may be applied to a process of establishing a call connection between two parties or establishing call connections between a plurality of parties pairwise.

In this embodiment, a method is used, including: requesting, by the first terminal, to establish a first call connection to a second terminal; obtaining, by the first terminal, a second vocoder list of the second terminal, the second vocoder list including vocoders supported by the second terminal and with corresponding priorities; obtaining, by the first terminal, a first vocoder with the highest priority among vocoders that exist in both a first vocoder list of the first terminal and the second vocoder list, the first vocoder list including vocoders supported by the first terminal and with corresponding priorities, and a vocoder with a higher audio frequency allowed in encoding and decoding having a higher priority; and requesting, by the first terminal by using the first vocoder, to establish the first call connection to the second terminal. Therefore, the first terminal obtains the second vocoder list of the second terminal, and determines, by using the first vocoder list and the second vocoder list, the first vocoder supported by both the first terminal and the second terminal and with the highest priority to establish the call connection to the second terminal, so that the optimal vocoder can be selected to establish the call connection to the second terminal, thereby improving efficiency of establishing the call connection.

In one implementation, the first terminal further includes:

(1) a first transmission unit, configured to transmit the first vocoder list of the first terminal to the second terminal before the first terminal requests, by using the first vocoder, to establish the first call connection to the second terminal, so that the second terminal determines the first vocoder with the highest priority among the vocoders that exist in both the first vocoder list and the second vocoder list, and replies with the first vocoder to the request of the first terminal to establish the first call connection.

In this embodiment, the first vocoder of the first terminal is transmitted to the second terminal, so that the second terminal may use the first vocoder to reply to the request, thereby improving efficiency of establishing the call connection between the first terminal and the second terminal.

In one implementation, the first terminal further includes:

(1) an establishment unit, configured to establish the first call connection between the first terminal and the second terminal after the first terminal requests, by using the first vocoder, to establish the first call connection to the second terminal;

(2) a third obtaining unit, configured to receive a third vocoder list transmitted by a third terminal, the third vocoder list including vocoders supported by the third terminal and with corresponding priorities, and the priorities being positively correlated with audio frequencies in encoding and decoding of the vocoders in the third vocoder list;

(3) a fourth obtaining unit, configured to obtain a second vocoder with the highest priority among vocoders that exist in the first vocoder list, the second vocoder list, and the third vocoder list; and (4) a processing unit, configured to switch the first vocoder for a call to the second terminal to the second vocoder, and request, by using the second vocoder, to establish a second call connection to the third terminal.

In this embodiment, through the foregoing method, the efficiency of establishing the call connection between the first terminal and the second terminal is improved, while pairwise call connection establishment between a plurality of terminals is implemented, thereby improving efficiency of establishing call connections between the plurality of terminals.

In one implementation, the first terminal further includes:

(1) a second transmission unit, configured to transmit the first vocoder list of the first terminal to the third terminal before the first terminal requests, by using the second vocoder, to establish the second call connection to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

In this embodiment, through the foregoing method, the efficiency of establishing the call connection between the first terminal and the second terminal is improved, while pairwise call connection establishment between a plurality of terminals is implemented, thereby improving efficiency of establishing call connections between the plurality of terminals.

In one implementation, the first terminal further includes:

(1) a receiving unit, configured to receive, after the first terminal requests, by using the second vocoder, to establish the second call connection to the third terminal, second audio data of the second terminal by using the first call connection, and receive third audio data of the third terminal by using the second call connection;

(2) an audio mixing unit, configured to perform an audio mixing operation on the second audio data and the third audio data, to obtain an audio mixing result; and (3) a playing unit, configured to play the audio mixing result.

In this embodiment, through the foregoing method, the audio mixing result of the audio data is obtained, and the audio mixing result is played, thereby improving the efficiency of establishing the call connection between the first terminal and the second terminal, while improving flexibility of audio mixing.

Figure 14:
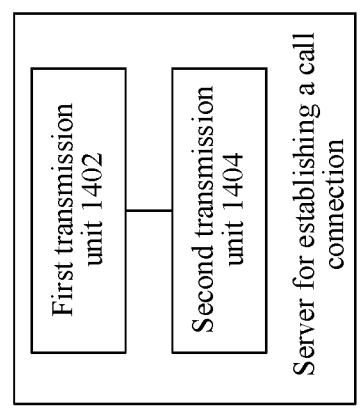
FIG. 14 is a schematic structural diagram of a server for establishing a call connection according to an embodiment of this application.

According to still another aspect of the embodiments of this application, a server for establishing a call connection configured to perform the foregoing method for establishing a call connection is further provided. As shown in FIG. 14, the server includes:

(1) a first transmission unit 1402, configured to transmit a second vocoder list of a second terminal to a first terminal, so that the first terminal determines a first vocoder with the highest priority among vocoders that exist in both a first vocoder list of the first terminal and the second vocoder list, and requests, by using the first vocoder, to establish a first call connection to the second terminal, the second vocoder list including vocoders supported by the second terminal and with corresponding priorities, the first vocoder list including vocoders supported by the first terminal and with corresponding priorities, and the priorities being positively correlated with audio frequencies in encoding and decoding of the vocoders in the first vocoder list or the vocoders in the second vocoder list; and (2) a second transmission unit 1404, configured to transmit the first vocoder list of the first terminal to the second terminal, so that the second terminal determines the first vocoder with the highest priority among the vocoders that exist in both the first vocoder list and the second vocoder list of the second terminal, and replies with the first vocoder to the request of the first terminal to establish the first call connection.

After the first terminal establishes the first call connection to the second terminal, if there is another terminal such as a third terminal requesting to establish call connections to the first terminal and the second terminal, the server needs to receive the first vocoder list of the first terminal and transmit the first vocoder list to the third terminal, receive the second vocoder list of the second terminal and transmit the second vocoder list to the third terminal, and receive a third vocoder list of the third terminal and transmit the third vocoder list to the first terminal and the second terminal.

In this embodiment, a call connection is established by using the foregoing method. Therefore, the first terminal obtains the second vocoder list of the second terminal, and determines, by using the first vocoder list and the second vocoder list, the first vocoder supported by both the first terminal and the second terminal and with the highest priority to establish a call connection to the second terminal, or the first terminal establishes call connections to the second terminal and the third terminal by using the second vocoder, so that the optimal vocoder can be selected to establish the call connection to the second terminal, thereby improving efficiency of establishing the call connection.

In one implementation, the server further includes:

(1) a receiving unit, configured to receive the third vocoder list of the third terminal after the first terminal establishes the first call connection to the second terminal, the third vocoder list including vocoders supported by the third terminal and with corresponding priorities, and the priorities being positively correlated with audio frequencies in encoding and decoding of the vocoders in the third vocoder list; and (2) a third transmission unit, configured to transmit the third vocoder list to the first terminal and the second terminal, and transmit the first vocoder list and the second vocoder list to the third terminal.

In this embodiment, through the foregoing method, the efficiency of establishing the first call connection between the first terminal and the second terminal is improved, a multi-party call is further implemented, and efficiency of establishing connections during the multi-party call is improved.

Figure 15:
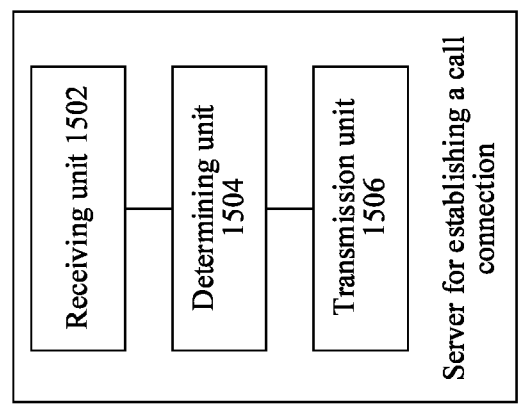
FIG. 15 is a schematic structural diagram of another server for establishing a call connection according to an embodiment of this application.

According to still another aspect of the embodiments of this application, a server for establishing a call connection configured to perform the foregoing method for establishing a call connection is further provided. As shown in FIG. 15, the server includes:

(1) a receiving unit 1502, configured to receive a first vocoder list of a first terminal and a second vocoder list of a second terminal, the second vocoder list including vocoders supported by the second terminal and with corresponding priorities, the first vocoder list including vocoders supported by the first terminal and with corresponding priorities, and the priorities of the vocoders being positively correlated with audio frequencies in encoding and decoding of the vocoders;

(2) a determining unit 1504, configured to determine a first vocoder with the highest priority among vocoders that exist in both the first vocoder list and the second vocoder list; and (3) a transmission unit 1506, configured to transmit a notification message carrying an identifier of the first vocoder to the first terminal and the second terminal, so that a first call connection is established between the first terminal and the second terminal by using the first vocoder according to the notification message.

In this embodiment, through the foregoing method, the first call connection is established between the first terminal and the second terminal. Therefore, a call connection can be established between the first terminal and the second terminal by using the vocoder supported by both and with the highest priority, thereby improving efficiency of establishing the call connection.

Figure 16:
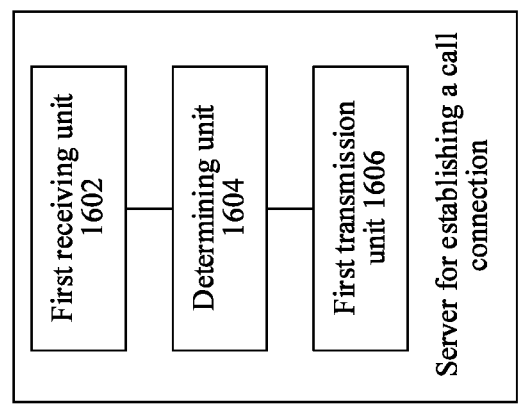
FIG. 16 is a schematic structural diagram of another server for establishing a call connection according to an embodiment of this application.

According to still another aspect of the embodiments of this application, a server for establishing a call connection configured to perform the foregoing method for establishing a call connection is further provided. As shown in FIG. 16, the server includes:

(1) a first receiving unit 1602, configured to receive a first vocoder list of a first terminal, the first vocoder list including vocoders supported by the first terminal and with corresponding priorities;

(2) a determining unit 1604, configured to determine a first vocoder with the highest priority among vocoders that exist in both the first vocoder list and a target vocoder list of the server, the target vocoder list including vocoders supported by the server and with corresponding priorities, and the priorities being positively correlated with audio frequencies in encoding and decoding of the vocoders in the first vocoder list or the vocoders in the target vocoder list; and (3) a first transmission unit 1606, configured to transmit a notification message carrying an identifier of the first vocoder to the first terminal, so that the first terminal establishes a first call connection to the server by using the first vocoder according to the notification message.

In some embodiments, this solution may be applied to a process of a multi-party voice call. In this solution, any terminal in the multi-party call may interact with the server by using the method shown in FIG. 10. For example, the first terminal interacts with the server. As shown in steps S1002 to S1012 in FIG. 10, the first terminal transmits the first vocoder list of the first terminal to the server, the server determines the first vocoder included in both the first vocoder list and the target vocoder list of the server and with the highest priority, and delivers a first vocoder message, and the first terminal determines to use the first vocoder to establish a call connection to the server. The server may establish a call connection to each terminal in the multi-party call by using the foregoing method.

In some embodiments, the server in this solution includes a call control server and an audio mixing server. Using a three-party call as an example, established connections may be shown in FIG. 11.

In this embodiment, through the foregoing method, the first call connection is established between the first terminal and the server, thereby improving efficiency of establishing the call connection.

In an example, the server further includes:

(1) a second receiving unit, configured to receive second audio data of a second terminal and third audio data of a third terminal after the first terminal establishes the call connection to the server, the second terminal and the third terminal being terminals that each establish a call connection to the server;

(2) an audio mixing unit, configured to perform an audio mixing operation on the second audio data and the third audio data, to obtain an audio mixing result; and (3) a second transmission unit, configured to transmit the audio mixing result to the first terminal.

In this embodiment, the server performs the audio mixing operation on the received audio data to obtain the audio mixing result, and transmits the audio mixing result to the first terminal, thereby improving the efficiency of the call connection, and improving the efficiency of audio mixing. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 17:
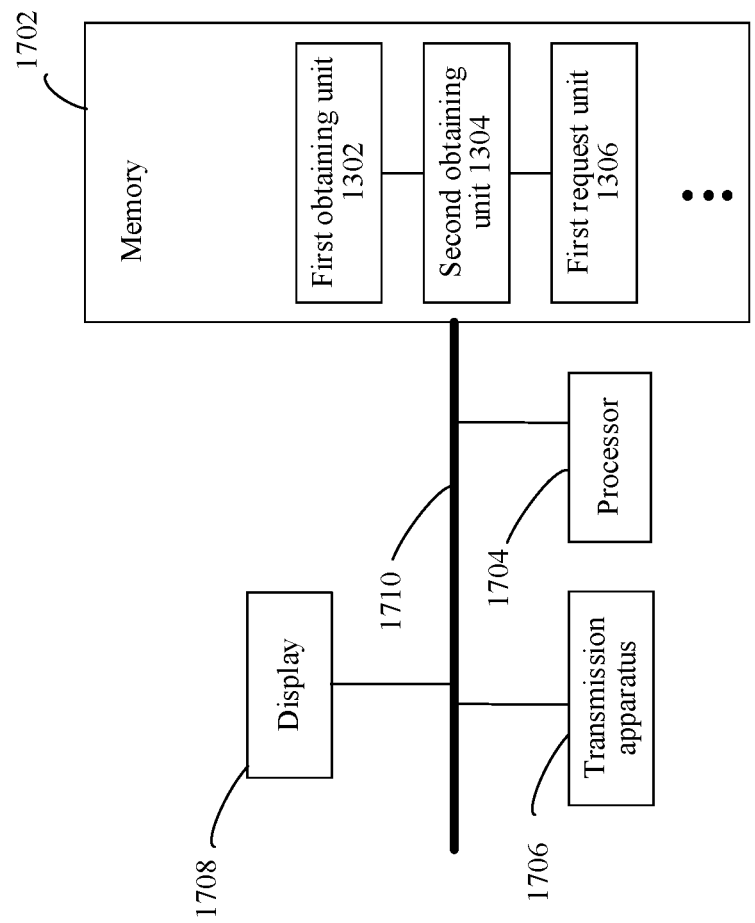
FIG. 17 is a schematic structural diagram of an electronic device according to an embodiment of this application.

According to still another aspect of the embodiments of this application, an electronic device for implementing the foregoing method for establishing a call connection is further provided. As shown in FIG. 17, the electronic device includes a memory 1702 and a processor 1704. The memory 1702 stores computer-readable instructions, and the processor 1704 is configured to perform steps in any one of the foregoing method embodiments by using the computer-readable instructions.

In some embodiments, in this embodiment, the electronic device may be located in at least one of a plurality of network devices in a computer network.

In some embodiments, in this embodiment, the processor may be configured to perform the following steps by using the computer-readable instructions:

S1. obtaining, by a first terminal, a second vocoder list of a second terminal, the second vocoder list including vocoders supported by the second terminal and with corresponding priorities;

S2. obtaining, by the first terminal, a first vocoder with the highest priority among vocoders that exist in both a first vocoder list of the first terminal and the second vocoder list, the first vocoder list including vocoders supported by the first terminal and with corresponding priorities, and the priorities being positively correlated with audio frequencies in encoding and decoding of the vocoders in the first vocoder list or the vocoders in the second vocoder list; and S3. requesting, by the first terminal by using the first vocoder, to establish a first call connection to the second terminal.

In some embodiments, a person of ordinary skill in the art may understand that, the structure shown in FIG. 17 is only illustrative. The electronic device may be alternatively a terminal device such as a smartphone (for example, an Android mobile phone or an iOS mobile phone), a tablet computer, a palmtop computer, a mobile Internet device (MID), or a PAD. FIG. 17 does not limit the structure of the electronic device. For example, the electronic device may further include more or fewer components (such as a network interface) than shown in FIG. 17, or have a configuration different from that shown in FIG. 17.

The memory 1702 may be configured to store a software program and a module, for example, a program instruction/module corresponding to the method for establishing a call connection and the first terminal in the embodiments of this application, and the processor 1704 performs various functional applications and data processing by running a software program and a module stored in the memory 1702, that is, implementing the foregoing method for establishing a call connection. The memory 1702 may include a high-speed random access memory (RAM), and may also include a non-volatile memory, for example, one or more magnetic storage apparatuses, a flash memory, or another non-volatile solid-state memory. In some embodiments, the memory 1702 may further include memories remotely disposed relative to the processor 1704, and the remote memories may be connected to a terminal by using a network. Examples of the network include, but are not limited to, the Internet, an intranet, a local area network, a mobile communication network, and a combination thereof. The memory 1702 may specifically, but not limited to, be configured to store information such as the second vocoder list. In an example, as shown in FIG. 17, the memory 1702 may include, but not limited to, the first obtaining unit 1302, a second obtaining unit 1304, and a first request unit 1306 in the foregoing first terminal. In addition, the memory may further include, but not limited to, other modules and units in the foregoing first terminal, and details are not repeated in this example.

In some embodiments, a transmission apparatus 1706 is configured to receive or transmit data via a network. Specific examples of the network may include a wired network and a wireless network. In an example, the transmission apparatus 1706 includes a network interface controller (NIC), which may be connected to another network device and a router by using a network cable, to communicate with the Internet or a local area network. In an example, the transmission apparatus 1706 is a radio frequency (RF) module, which communicates with the Internet in a wireless manner.

In addition, the electronic device further includes: a display 1708, configured to display exchanged information; and a connection bus 1710, configured to connect various module components in the electronic device.

Figure 18:
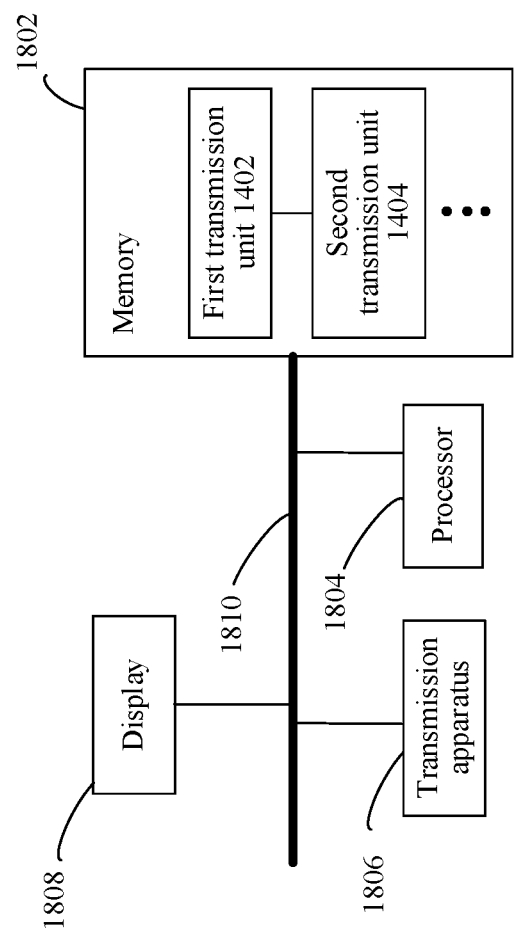
FIG. 18 is a schematic structural diagram of another electronic device according to an embodiment of this application.

According to still another aspect of the embodiments of this application, an electronic device for implementing the foregoing method for establishing a call connection is further provided. As shown in FIG. 18, the electronic device includes a memory 1802 and a processor 1804. The memory 1802 stores computer-readable instructions, and the processor 1804 is configured to perform steps in any one of the foregoing method embodiments by using the computer-readable instructions.

In some embodiments, in this embodiment, the electronic device may be located in at least one of a plurality of network devices of a computer network.

In some embodiments, in this embodiment, the processor may be configured to perform the following steps by using the computer-readable instructions:

S1. transmitting, by a server, a second vocoder list of a second terminal to a first terminal, so that the first terminal determines a first vocoder with the highest priority among vocoders that exist in both a first vocoder list of the first terminal and the second vocoder list, and requests, by using the first vocoder, to establish a first call connection to the second terminal, the second vocoder list including vocoders supported by the second terminal and with corresponding priorities, the first vocoder list including vocoders supported by the first terminal and with corresponding priorities, and the priorities being positively correlated with audio frequencies in encoding and decoding of the vocoders in the first vocoder list or the vocoders in the second vocoder list; and S2. transmitting, by the server, the first vocoder list of the first terminal to the second terminal, so that the second terminal determines the first vocoder with the highest priority among the vocoders that exist in both the first vocoder list and the second vocoder list of the second terminal, and replies with the first vocoder to the request of the first terminal to establish the first call connection.

In some embodiments, a person of ordinary skill in the art may understand that, the structure shown in FIG. 18 is only illustrative. The electronic device may be alternatively a terminal device such as a smartphone (for example, an Android mobile phone or an iOS mobile phone), a tablet computer, a palmtop computer, a MID, or a PAD. FIG. 18 does not limit the structure of the electronic device. For example, the electronic device may further include more or fewer components (such as a network interface) than those shown in FIG. 18, or have a configuration different from that shown in FIG. 18.

The memory 1802 may be configured to store a software program and a module, for example, a program instruction/module corresponding to the method for establishing a call connection and the server for establishing a call connection in the embodiments of this application, and the processor 1804 performs various functional applications and data processing by running a software program and a module stored in the memory 1802, that is, implementing the foregoing method for establishing a call connection. The memory 1802 may include a high-speed RAM, and may also include a non-volatile memory, for example, one or more magnetic storage apparatuses, a flash memory, or another non-volatile solid-state memory. In some embodiments, the memory 1802 may further include memories remotely disposed relative to the processor 1804, and the remote memories may be connected to a terminal by using a network. Examples of the network include, but are not limited to, the Internet, an intranet, a local area network, a mobile communication network, and a combination thereof. The memory 1802 may specifically, but not limited to, be configured to store information such as the first vocoder list, the second vocoder list, and the third vocoder list. In an example, as shown in FIG. 18, the memory 1802 may include, but not limited to, the first transmission unit 1402 and the second transmission unit 1404 in the foregoing server for establishing a call connection. In addition, the memory may further include, but not limited to, other modules and units in the foregoing server for establishing a call connection, and details are not repeated in this example.

In some embodiments, a transmission apparatus 1806 is configured to receive or transmit data via a network. Specific examples of the network may include a wired network and a wireless network. In an example, the transmission apparatus 1806 includes a NIC, which may be connected to another network device and a router by using a network cable, to communicate with the Internet or a local area network. In an example, the transmission apparatus 1806 is an RF module, which communicates with the Internet in a wireless manner.

In addition, the electronic device further includes: a display 1808, configured to display a connection establishment result; and a connection bus 1810, configured to connect various module components in the electronic device.

Figure 19:
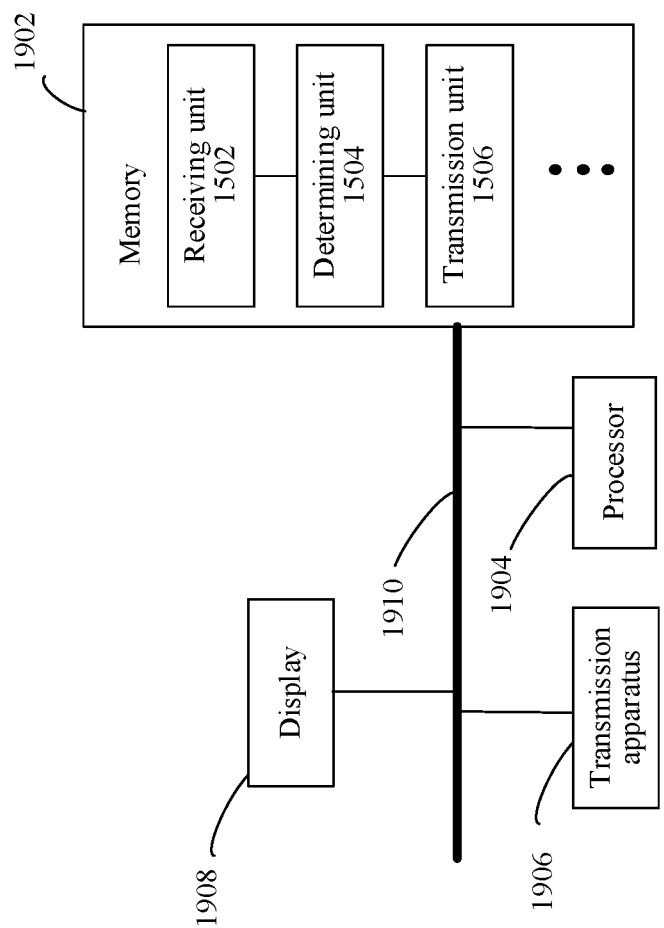
FIG. 19 is a schematic structural diagram of still another electronic device according to an embodiment of this application.

According to still another aspect of the embodiments of this application, an electronic device for implementing the foregoing method for establishing a call connection is further provided. As shown in FIG. 19, the electronic device includes a memory 1902 and a processor 1904. The memory 1902 stores computer-readable instructions, and the processor 1904 is configured to perform steps in any one of the foregoing method embodiments by using the computer-readable instructions.

In some embodiments, in this embodiment, the electronic device may be located in at least one of a plurality of network devices of a computer network.

In some embodiments, in this embodiment, the processor may be configured to perform the following steps by using the computer-readable instructions:

S1. receiving, by a server, a first vocoder list of a first terminal and a second vocoder list of a second terminal, the second vocoder list including vocoders supported by the second terminal and with corresponding priorities, the first vocoder list including vocoders supported by the first terminal and with corresponding priorities, the priorities being positively correlated with audio frequencies in encoding and decoding of the vocoders in the first vocoder list or the vocoders in the second vocoder list;

S2. determining, by the server, a first vocoder with the highest priority among vocoders that exist in both the first vocoder list and the second vocoder list; and S3. transmitting, by the server, a notification message carrying an identifier of the first vocoder to the first terminal and the second terminal, so that a first call connection is established between the first terminal and the second terminal by using the first vocoder according to the notification message.

In some embodiments, a person of ordinary skill in the art may understand that, the structure shown in FIG. 19 is only illustrative. The electronic device may be alternatively a terminal device such as a smartphone (for example, an Android mobile phone or an iOS mobile phone), a tablet computer, a palmtop computer, a MID, or a PAD. FIG. 19 does not limit the structure of the electronic device. For example, the electronic device may further include more or fewer components (such as a network interface) than those shown in FIG. 19, or have a configuration different from that shown in FIG. 19.

The memory 1902 may be configured to store a software program and a module, for example, a program instruction/module corresponding to the method for establishing a call connection and the server for establishing a call connection in the embodiments of this application, and the processor 1904 performs various functional applications and data processing by running a software program and a module stored in the memory 1902, that is, implementing the foregoing method for establishing a call connection. The memory 1902 may include a high-speed RAM, and may also include a non-volatile memory, for example, one or more magnetic storage apparatuses, a flash memory, or another non-volatile solid-state memory. In some embodiments, the memory 1902 may further include memories remotely disposed relative to the processor 1904, and the remote memories may be connected to a terminal by using a network. Examples of the network include, but are not limited to, the Internet, an intranet, a local area network, a mobile communication network, and a combination thereof. The memory 1902 may specifically, but not limited to, be configured to store information such as the first vocoder list and the second vocoder list. In an example, as shown in FIG. 19, the memory 1902 may include, but not limited to, the receiving unit 1502, the determining unit 1504, and the transmission unit 1506 in the foregoing server for establishing a call connection. In addition, the memory may further include, but not limited to, other modules and units in the foregoing server for establishing a call connection, and details are not repeated in this example.

In some embodiments, a transmission apparatus 1906 is configured to receive or transmit data via a network. Specific examples of the network may include a wired network and a wireless network. In an example, the transmission apparatus 1906 includes a NIC, which may be connected to another network device and a router by using a network cable, to communicate with the Internet or a local area network. In an example, the transmission apparatus 1906 is an RF module, which communicates with the Internet in a wireless manner.

In addition, the electronic device further includes: a display 1908, configured to display an interaction result; and a connection bus 1910, configured to connect various module components in the electronic device.

Figure 20:
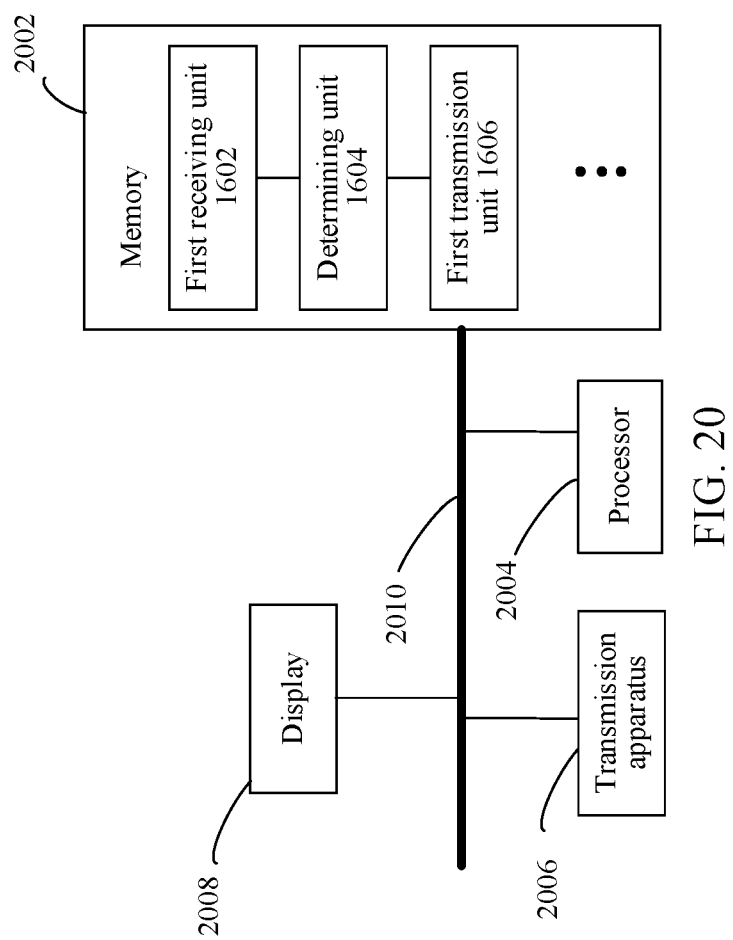
FIG. 20 is a schematic structural diagram of still another electronic device according to an embodiment of this application.

According to still another aspect of the embodiments of this application, an electronic device for implementing the foregoing method for establishing a call connection is further provided. As shown in FIG. 20, the electronic device includes a memory 2002 and a processor 2004. The memory 2002 stores computer-readable instructions, and the processor 2004 is configured to perform steps in any one of the foregoing method embodiments by using the computer-readable instructions.

In some embodiments, in this embodiment, the electronic device may be located in at least one of a plurality of network devices of a computer network.

In some embodiments, in this embodiment, the processor may be configured to perform the following steps by using the computer-readable instructions:

S1. receiving, by a server, a first vocoder list of a first terminal, the first vocoder list including vocoders supported by the first terminal and with corresponding priorities;

S2. determining, by the server, a first vocoder with the highest priority among vocoders that exist in both the first vocoder list and a target vocoder list of the server, the target vocoder list including vocoders supported by the server and with corresponding priorities, and the priorities being positively correlated with audio frequencies in encoding and decoding of the vocoders in the first vocoder list or the vocoders in the target vocoder list; and S3. transmitting, by the server, a notification message carrying an identifier of the first vocoder to the first terminal, so that the first terminal establishes a first call connection to the server by using the first vocoder according to the notification message.

In some embodiments, a person of ordinary skill in the art may understand that, the structure shown in FIG. 20 is only illustrative. The electronic device may be alternatively a terminal device such as a smartphone (for example, an Android mobile phone or an iOS mobile phone), a tablet computer, a palmtop computer, a MID, or a PAD. FIG. 20 does not limit the structure of the electronic device. For example, the electronic device may further include more or fewer components (such as a network interface) than those shown in FIG. 20, or have a configuration different from that shown in FIG. 20.

The memory 2002 may be configured to store a software program and a module, for example, a program instruction/module corresponding to the method for establishing a call connection and the server for establishing a call connection in the embodiments of this application, and the processor 2004 performs various functional applications and data processing by running a software program and a module stored in the memory 2002, that is, implementing the foregoing method for establishing a call connection. The memory 2002 may include a high-speed RAM, and may also include a non-volatile memory, for example, one or more magnetic storage apparatuses, a flash memory, or another non-volatile solid-state memory. In some embodiments, the memory 2002 may further include memories remotely disposed relative to the processor 2004, and the remote memories may be connected to a terminal by using a network. Examples of the network include, but are not limited to, the Internet, an intranet, a local area network, a mobile communication network, and a combination thereof. The memory 2002 may specifically, but not limited to, be configured to store information such as the second vocoder list. In an example, as shown in FIG. 20, the memory 2002 may include, but not limited to, the first receiving unit 1602, the determining unit 1604, and the first transmission unit 1606 in the foregoing server for establishing a call connection. In addition, the memory may further include, but not limited to, other modules and units in the foregoing server for establishing a call connection, and details are not repeated in this example.

In some embodiments, a transmission apparatus 2006 is configured to receive or transmit data via a network. Specific examples of the network may include a wired network and a wireless network. In an example, the transmission apparatus 2006 includes a NIC, which may be connected to another network device and a router by using a network cable, to communicate with the Internet or a local area network. In an example, the transmission apparatus 2006 is an RF module, which communicates with the Internet in a wireless manner.

In addition, the electronic device further includes: a display 2008, configured to display an interaction result; and a connection bus 2010, configured to connect various module components in the electronic device.

According to still another aspect of the embodiments of this application, a storage medium is further provided. The storage medium stores computer-readable instructions, the computer-readable instructions being configured to perform, when run, steps in any one of the foregoing method embodiments.

In some embodiments, in this embodiment, the storage medium may be configured to store computer-readable instructions for performing the following steps:

S1. obtaining, by a first terminal, a second vocoder list of a second terminal, the second vocoder list including vocoders supported by the second terminal and with corresponding priorities;

S2. determining, by the first terminal, a first vocoder with the highest priority among vocoders that exist in both a first vocoder list of the first terminal and the second vocoder list, the first vocoder list including vocoders supported by the first terminal and with corresponding priorities, the priorities being positively correlated with audio frequencies in encoding and decoding of the vocoders in the first vocoder list or the vocoders in the second vocoder list; and S3. requesting, by the first terminal by using the first vocoder, to establish a first call connection to the second terminal.

In some embodiments, in this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a RAM, a magnetic disk, an optical disc, or the like.

In some embodiments, a computer program product or a computer program is provided. The computer program product or the computer program includes computer instructions, and the computer instructions are stored in a computer-readable storage medium. A processor of a computer device reads the computer instructions from the computer-readable storage medium, and the processor executes the computer instructions, to cause the computer device to perform steps in the foregoing method embodiments.

The sequence numbers of the foregoing embodiments of this application are merely for description purposes, and are not intended to indicate the preference among the embodiments.

It is to be understood that the steps in the embodiments of this application are not necessarily performed according to a sequence indicated by step numbers. Unless clearly specified in this specification, there is no strict sequence limitation on the execution of the steps, and the steps may be performed in another sequence. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed in turn or alternately with other steps or at least some of sub-steps or stages of other steps.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The device embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for establishing a call connection performed at a first terminal, the method comprising:

obtaining, by the first terminal, a second vocoder list of a second terminal, the second vocoder list comprising vocoders supported by the second terminal and with corresponding priorities;

determining, by the first terminal, a first vocoder with the highest priority among vocoders that exist in both a first vocoder list of the first terminal and the second vocoder list, the first vocoder list comprising vocoders supported by the first terminal and with corresponding priorities, and the priorities of the vocoders being positively correlated with audio frequencies in encoding and decoding of the vocoders; and requesting, by the first terminal by using the first vocoder, to establish a first call connection to the second terminal.

2. The method according to claim 1, wherein before the requesting, by the first terminal by using the first vocoder, to establish a first call connection to the second terminal, the method further comprises:

transmitting, by the first terminal, the first vocoder list of the first terminal to the second terminal, so that the second terminal determines the first vocoder with the highest priority among the vocoders that exist in both the first vocoder list and the second vocoder list, and replies with the first vocoder to the request of the first terminal to establish the first call connection.

3. The method according to claim 1, wherein after the requesting, by the first terminal by using the first vocoder, to establish a first call connection to the second terminal, the method further comprises:

establishing the first call connection between the first terminal and the second terminal;

receiving, by the first terminal, a third vocoder list transmitted by a third terminal, the third vocoder list comprising vocoders supported by the third terminal and with corresponding priorities;

determining, by the first terminal, a second vocoder with the highest priority among vocoders that exist in the first vocoder list, the second vocoder list, and the third vocoder list; and switching, by the first terminal, the first vocoder to the second vocoder, and requesting, by the first terminal by using the second vocoder, to establish a second call connection to the third terminal.

4. The method according to claim 3, wherein before the requesting, by the first terminal by using the second vocoder, to establish a second call connection to the third terminal, the method further comprises:

transmitting, by the first terminal, the first vocoder list of the first terminal to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

5. The method according to claim 3, wherein after the requesting, by the first terminal by using the second vocoder, to establish a second call connection to the third terminal, the method further comprises:

receiving, by the first terminal, second audio data of the second terminal by using the first call connection, and receiving third audio data of the third terminal by using the second call connection;

performing, by the first terminal, an audio mixing operation on the second audio data and the third audio data, to obtain an audio mixing result; and playing, by the first terminal, the audio mixing result.

6. One or more non-transitory computer-readable storage media storing computer-readable instructions, the computer-readable instructions, when executed by one or more processors of a first terminal, causing the one or more processors to perform a plurality of operations including:

obtaining, by the first terminal, a second vocoder list of a second terminal, the second vocoder list comprising vocoders supported by the second terminal and with corresponding priorities;

determining, by the first terminal, a first vocoder with the highest priority among vocoders that exist in both a first vocoder list of the first terminal and the second vocoder list, the first vocoder list comprising vocoders supported by the first terminal and with corresponding priorities, and the priorities of the vocoders being positively correlated with audio frequencies in encoding and decoding of the vocoders; and requesting, by the first terminal by using the first vocoder, to establish a first call connection to the second terminal.

7. The one or more non-transitory computer-readable storage media according to claim 6, wherein before the requesting, by the first terminal by using the first vocoder, to establish a first call connection to the second terminal, the plurality of operations further comprise:

transmitting, by the first terminal, the first vocoder list of the first terminal to the second terminal, so that the second terminal determines the first vocoder with the highest priority among the vocoders that exist in both the first vocoder list and the second vocoder list, and replies with the first vocoder to the request of the first terminal to establish the first call connection.

8. The one or more non-transitory computer-readable storage media according to claim 6, wherein after the requesting, by the first terminal by using the first vocoder, to establish a first call connection to the second terminal, the plurality of operations further comprise:

establishing the first call connection between the first terminal and the second terminal;

receiving, by the first terminal, a third vocoder list transmitted by a third terminal, the third vocoder list comprising vocoders supported by the third terminal and with corresponding priorities;

determining, by the first terminal, a second vocoder with the highest priority among vocoders that exist in the first vocoder list, the second vocoder list, and the third vocoder list; and switching, by the first terminal, the first vocoder to the second vocoder, and requesting, by the first terminal by using the second vocoder, to establish a second call connection to the third terminal.

9. The one or more non-transitory computer-readable storage media according to claim 8, wherein before the requesting, by the first terminal by using the second vocoder, to establish a second call connection to the third terminal, the plurality of operations further comprise:

transmitting, by the first terminal, the first vocoder list of the first terminal to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

10. The one or more non-transitory computer-readable storage media according to claim 8, wherein after the requesting, by the first terminal by using the second vocoder, to establish a second call connection to the third terminal, the plurality of operations further comprise:

receiving, by the first terminal, second audio data of the second terminal by using the first call connection, and receiving third audio data of the third terminal by using the second call connection;

performing, by the first terminal, an audio mixing operation on the second audio data and the third audio data, to obtain an audio mixing result; and playing, by the first terminal, the audio mixing result.

11. An electronic device acting as a first terminal, comprising a memory and a processor, the memory storing computer-readable instructions, the computer-readable instructions, when executed by the processor, causing the processor to perform a plurality of operations including:

obtaining, by the first terminal, a second vocoder list of a second terminal, the second vocoder list comprising vocoders supported by the second terminal and with corresponding priorities;

determining, by the first terminal, a first vocoder with the highest priority among vocoders that exist in both a first vocoder list of the first terminal and the second vocoder list, the first vocoder list comprising vocoders supported by the first terminal and with corresponding priorities, and the priorities of the vocoders being positively correlated with audio frequencies in encoding and decoding of the vocoders; and requesting, by the first terminal by using the first vocoder, to establish a first call connection to the second terminal.

12. The electronic device according to claim 11, wherein before the requesting, by the first terminal by using the first vocoder, to establish a first call connection to the second terminal, the plurality of operations further comprise:

transmitting, by the first terminal, the first vocoder list of the first terminal to the second terminal, so that the second terminal determines the first vocoder with the highest priority among the vocoders that exist in both the first vocoder list and the second vocoder list, and replies with the first vocoder to the request of the first terminal to establish the first call connection.

13. The electronic device according to claim 11, wherein after the requesting, by the first terminal by using the first vocoder, to establish a first call connection to the second terminal, the plurality of operations further comprise:

establishing the first call connection between the first terminal and the second terminal;

receiving, by the first terminal, a third vocoder list transmitted by a third terminal, the third vocoder list comprising vocoders supported by the third terminal and with corresponding priorities;

determining, by the first terminal, a second vocoder with the highest priority among vocoders that exist in the first vocoder list, the second vocoder list, and the third vocoder list; and switching, by the first terminal, the first vocoder to the second vocoder, and requesting, by the first terminal by using the second vocoder, to establish a second call connection to the third terminal.

14. The electronic device according to claim 13, wherein before the requesting, by the first terminal by using the second vocoder, to establish a second call connection to the third terminal, the plurality of operations further comprise:

transmitting, by the first terminal, the first vocoder list of the first terminal to the third terminal, so that the third terminal determines the second vocoder with the highest priority among the vocoders that exist in the first vocoder list, the second vocoder list transmitted by the second terminal, and the third vocoder list, and replies with the second vocoder to the request of the first terminal to establish the second call connection.

15. The electronic device according to claim 13, wherein after the requesting, by the first terminal by using the second vocoder, to establish a second call connection to the third terminal, the plurality of operations further comprise:

receiving, by the first terminal, second audio data of the second terminal by using the first call connection, and receiving third audio data of the third terminal by using the second call connection;

performing, by the first terminal, an audio mixing operation on the second audio data and the third audio data, to obtain an audio mixing result; and playing, by the first terminal, the audio mixing result.

* * * * *